US010897145B2

(12) United States Patent
De Breucker et al.

(10) Patent No.: US 10,897,145 B2
(45) Date of Patent: Jan. 19, 2021

(54) DEVICE AND METHOD FOR THE RECONFIGURATION OF A RECHARGEABLE ENERGY STORAGE DEVICE INTO SEPARATE BATTERY CONNECTION STRINGS

(71) Applicant: VITO NV, Mol (BE)

(72) Inventors: Sven De Breucker, Mol (BE); Dominique Weyen, Mol (BE); Rafael Ponnette, Mol (BE); Peter Coenen, Mol (BE)

(73) Assignee: VITO NV, Mol (BE)

( * ) Notice: Subject to any disclaimer, the term of this patent is extended or adjusted under 35 U.S.C. 154(b) by 63 days.

(21) Appl. No.: 16/066,773

(22) PCT Filed: Dec. 23, 2016

(86) PCT No.: PCT/EP2016/082650
§ 371 (c)(1),
(2) Date: Jun. 28, 2018

(87) PCT Pub. No.: WO2017/114802
PCT Pub. Date: Jul. 6, 2017

(65) Prior Publication Data
US 2019/0013681 A1  Jan. 10, 2019

(30) Foreign Application Priority Data
Dec. 29, 2015  (EP) .................... 15202963

(51) Int. Cl.
*H02J 7/00*  (2006.01)
*H02J 7/34*  (2006.01)
(52) U.S. Cl.
CPC .......... *H02J 7/0024* (2013.01); *H02J 7/0021* (2013.01); *H02J 7/34* (2013.01); *H02J 7/345* (2013.01)

(58) Field of Classification Search
CPC .............................. H02J 7/0024; H02J 7/0021
(Continued)

(56) References Cited

U.S. PATENT DOCUMENTS 4,175,249 A * 11/1979 Gruber ...................... G05F 1/67
136/293
4,274,043 A *  6/1981 Heitz ................ H01M 10/4207
307/151
(Continued)

FOREIGN PATENT DOCUMENTS

WO     2014020582 A2    2/2014

OTHER PUBLICATIONS

European Office Action in corresponding European Application No. 16829086.4-1202, dated May 9, 2019.
(Continued)

*Primary Examiner* — John T Trischler
(74) *Attorney, Agent, or Firm* — Bacon & Thomas, PLLC

(57) ABSTRACT

Reconfiguration of a rechargeable energy storage system into two or more new capacitor or battery or fuel cell packs arranged in "connections", e.g. series or parallel strings. Each pack of rechargeable energy storage devices includes rechargeable energy storage modules. In each rechargeable energy storage module, which can include one or more capacitors or fuel cells or battery cells, there is arranged a network of banks of switches. A first bank of switches is arranged to connect a rechargeable energy storage module in a first series connection string with other rechargeable energy storage modules. A second bank of switches is arranged to connect a rechargeable energy storage module in a second connection string with other rechargeable energy storage modules. A first bypass switch is arranged to exclude a rechargeable energy storage module from the first series connection string when the first bypass switch is activated.

19 Claims, 20 Drawing Sheets

(58) Field of Classification Search
USPC .......................................................... 320/117
See application file for complete search history.

(56) References Cited

U.S. PATENT DOCUMENTS

| | | | | | |
|---|---|---|---|---|---|
| 5,506,456 | A * | 4/1996 | Yang | ..................... | H02J 7/0024 307/63 |
| 5,656,915 | A * | 8/1997 | Eaves | ................. | H01M 10/482 320/118 |
| 5,744,936 | A * | 4/1998 | Kawakami | ........ | H01M 10/4207 320/120 |
| 5,773,962 | A * | 6/1998 | Nor | .................... | G01R 31/3648 320/134 |
| 5,784,626 | A * | 7/1998 | Odaohara | ................ | H02J 1/10 307/66 |
| 5,880,575 | A * | 3/1999 | Itou | ..................... | H01M 10/441 320/122 |
| 5,898,291 | A * | 4/1999 | Hall | ..................... | H02J 7/0026 320/118 |
| 5,960,898 | A * | 10/1999 | Okada | ................... | H02J 7/0024 180/65.8 |
| 6,034,506 | A * | 3/2000 | Hall | ..................... | H02J 7/0019 320/101 |
| 6,064,178 | A * | 5/2000 | Miller | ................... | H02J 7/0016 320/117 |
| 6,140,799 | A * | 10/2000 | Thomasson | ......... | H01M 10/441 320/117 |
| 6,260,649 | B1 * | 7/2001 | Carney, Jr. | ................ | B60L 7/12 180/220 |
| 6,326,768 | B2 * | 12/2001 | Nagai | ................... | H02J 7/0013 320/116 |
| 6,430,692 | B1 * | 8/2002 | Kimble | ................... | G06F 1/263 307/66 |
| 6,580,249 | B2 * | 6/2003 | Yau | ....................... | H02J 7/0022 320/122 |
| 6,731,022 | B2 * | 5/2004 | Silverman | ............... | H01M 2/20 307/139 |
| 6,822,423 | B2 * | 11/2004 | Yau | ....................... | H02J 7/0018 320/122 |
| 6,873,133 | B1 * | 3/2005 | Kavounas | ............... | H02J 7/345 320/103 |
| 7,075,194 | B2 * | 7/2006 | Weidenheimer | ......... | F41B 6/00 180/65.1 |
| 7,135,836 | B2 * | 11/2006 | Kutkut | ................... | H02J 7/022 320/116 |
| 7,208,894 | B1 * | 4/2007 | Earle | ....................... | B60L 15/12 318/105 |
| 7,227,310 | B2 * | 6/2007 | Van Tichelen | ........... | H04B 3/54 315/136 |
| 7,279,867 | B2 * | 10/2007 | Benckenstein, Jr. | . | H02J 7/0016 320/112 |
| 7,365,516 | B2 * | 4/2008 | Leyten | ................... | H01M 10/44 320/116 |
| 7,456,521 | B2 * | 11/2008 | Weidenheimer | ......... | F41B 6/00 307/71 |
| 7,456,610 | B2 * | 11/2008 | Yamashita | ............... | H02J 7/0016 320/116 |
| RE40,663 | E * | 3/2009 | Silverman | ............... | H01M 2/20 307/139 |
| 7,516,726 | B2 * | 4/2009 | Esaka | ................... | H02J 7/0019 123/179.3 |
| 7,535,199 | B2 * | 5/2009 | Kimura | ................... | H02J 7/0026 320/116 |
| 7,557,538 | B2 * | 7/2009 | Yau | ....................... | H02J 7/0016 320/116 |
| 7,609,031 | B2 * | 10/2009 | Benckenstein | ....... | H02J 7/0016 307/66 |
| 7,692,404 | B2 * | 4/2010 | Harris | ....................... | B60L 7/14 320/117 |
| 7,705,491 | B2 * | 4/2010 | King | ....................... | B60L 3/0046 307/80 |
| RE41,676 | E * | 9/2010 | Yau | ....................... | H02J 7/0022 320/119 |
| 7,893,561 | B2 * | 2/2011 | Weidenheimer | ......... | F41B 6/00 307/71 |
| 7,898,223 | B2 * | 3/2011 | Takeda | .................... | H02M 3/07 320/117 |
| 8,084,887 | B2 * | 12/2011 | Weidenheimer | ......... | F41B 6/00 307/71 |
| 8,330,419 | B2 * | 12/2012 | Kim | .................. | H01M 10/4207 320/121 |
| 8,330,420 | B2 * | 12/2012 | Kim | ..................... | H01M 10/44 320/122 |
| 8,354,824 | B2 * | 1/2013 | Chaturvedi | ......... | H01M 10/482 320/116 |
| 8,400,012 | B2 * | 3/2013 | Weidenheimer | ......... | F41B 6/00 307/71 |
| 8,405,351 | B2 * | 3/2013 | Chaturvedi | ....... | H01M 10/0525 320/118 |
| 8,427,106 | B2 * | 4/2013 | Kim | .................. | H01M 10/4207 320/121 |
| 8,470,464 | B2 * | 6/2013 | Troutman | ........ | G01R 19/16542 429/61 |
| 8,502,502 | B2 * | 8/2013 | Huang | ................... | H01M 2/204 320/116 |
| 8,629,648 | B2 * | 1/2014 | Papastergiou | ............ | H02J 7/35 136/261 |
| 8,633,671 | B2 * | 1/2014 | Kelly | ................... | H01M 10/465 136/244 |
| 8,643,323 | B2 * | 2/2014 | Bakas | ....................... | H02J 7/35 136/291 |
| 8,710,801 | B2 * | 4/2014 | Schwartz | ............... | H02J 7/0016 320/119 |
| 8,716,894 | B2 * | 5/2014 | Uno | ..................... | H02J 7/0014 307/77 |
| 8,736,229 | B2 * | 5/2014 | Kawahara | ............. | B60L 3/0046 320/116 |
| 8,760,122 | B2 * | 6/2014 | Demetriades | ............. | H02J 3/32 320/107 |
| 8,773,068 | B2 * | 7/2014 | Nysen | ................... | H02J 7/0016 320/116 |
| 8,816,613 | B2 * | 8/2014 | Lee | ....................... | H02J 7/0024 318/140 |
| 8,907,676 | B2 * | 12/2014 | Coenen | ................ | G01R 31/026 324/433 |
| 8,928,174 | B2 * | 1/2015 | Muto | ..................... | H02J 7/0024 307/71 |
| 8,928,281 | B2 * | 1/2015 | Murase | ................. | H01M 2/202 320/116 |
| 8,928,282 | B2 * | 1/2015 | Kudo | ................... | H01M 10/425 320/118 |
| 8,942,014 | B2 * | 1/2015 | Norrga | .................... | H02M 1/32 363/68 |
| 8,957,610 | B2 * | 2/2015 | Lee | ....................... | H02J 7/0024 318/139 |
| 8,957,624 | B2 * | 2/2015 | Nysen | ................... | H02J 7/0016 320/103 |
| 8,981,683 | B2 * | 3/2015 | Hambitzer | ............... | B60L 58/10 318/139 |
| 9,035,578 | B2 * | 5/2015 | Feuerstack | ............ | H02J 7/0024 318/139 |
| 9,106,161 | B2 * | 8/2015 | Feuerstack | ............ | H02J 7/0024 |
| 9,172,254 | B2 * | 10/2015 | Ganor | ..................... | B60L 58/21 |
| 9,196,933 | B2 * | 11/2015 | Christensen | ........ | H01M 10/441 |
| 9,197,081 | B2 * | 11/2015 | Finberg | ................. | H02J 7/0016 |
| 9,270,127 | B2 * | 2/2016 | Coenen | ................ | H02J 7/0018 |
| 9,276,463 | B2 * | 3/2016 | Fleming | ................. | H02M 3/158 |
| 9,312,692 | B2 * | 4/2016 | Feuerstack | .......... | H02J 2207/40 |
| 9,318,900 | B2 * | 4/2016 | Dien | ..................... | H02J 7/0013 |
| 9,331,515 | B2 * | 5/2016 | Feuerstack | ............ | H02J 7/0024 |
| 9,356,451 | B2 * | 5/2016 | Kawahara | ............. | B60L 3/0046 |
| 9,362,759 | B2 * | 6/2016 | Nakao | ................... | H01M 10/48 |
| 9,385,542 | B2 * | 7/2016 | Chang | ................... | H02J 7/0019 |
| 9,413,229 | B2 * | 8/2016 | Fleming | ................. | H02M 3/158 |
| 9,425,617 | B2 * | 8/2016 | Weidenheimer | ......... | F41B 6/00 |
| 9,450,274 | B2 * | 9/2016 | Vo | ..................... | H01M 10/4257 |
| 9,493,090 | B2 * | 11/2016 | Timmons | ............. | B60L 11/1855 |
| 9,564,763 | B2 * | 2/2017 | Finberg | ................. | H02J 7/0016 |
| 9,601,940 | B2 * | 3/2017 | Camp | ................... | H02J 7/0019 |
| 9,638,759 | B2 * | 5/2017 | Coenen | ................ | G01R 31/026 |

(56) References Cited

U.S. PATENT DOCUMENTS

| | | | | |
|---|---|---|---|---|
| 9,735,590 B2* | 8/2017 | Wang | | H02J 7/0016 |
| 9,748,786 B2* | 8/2017 | Camp | | H02J 7/0019 |
| 9,793,725 B2* | 10/2017 | Sung | | H02J 7/0021 |
| 9,793,850 B2* | 10/2017 | Feuerstack | | H02P 31/00 |
| 9,800,171 B2* | 10/2017 | Tahata | | H02J 5/00 |
| 9,910,471 B1* | 3/2018 | Marr | | G06F 1/30 |
| 9,923,399 B2* | 3/2018 | Camp | | H02J 7/0018 |
| 10,033,212 B2* | 7/2018 | Camp | | H02J 7/007 |
| 10,044,069 B2* | 8/2018 | Despesse | | H02J 7/0013 |
| 10,069,313 B2* | 9/2018 | Tkachenko | | H02J 7/0016 |
| 10,074,997 B2* | 9/2018 | Vo | | H01M 10/4257 |
| 10,193,192 B2* | 1/2019 | Gagneur | | H01M 2/34 |
| 10,193,359 B2* | 1/2019 | Ganor | | B60L 58/21 |
| 10,236,695 B2* | 3/2019 | Weyen | | G01R 31/36 |
| 10,293,702 B2* | 5/2019 | Tu | | B60L 3/0046 |
| 10,305,298 B2* | 5/2019 | Kristensen | | H02J 7/0026 |
| 10,396,678 B2* | 8/2019 | Uda | | H02M 7/217 |
| 10,442,309 B2* | 10/2019 | Goetz | | H02J 7/0021 |
| 10,461,307 B2* | 10/2019 | Kim | | H01M 2/347 |
| 10,473,728 B2* | 11/2019 | Goetz | | H02M 7/483 |
| 10,476,402 B2* | 11/2019 | Uda | | H02M 7/537 |
| 10,498,145 B2* | 12/2019 | Gagneur | | H02J 7/0024 |
| 10,573,935 B2* | 2/2020 | Muenzel | | H01M 10/441 |
| 10,651,660 B2* | 5/2020 | Ganor | | B60L 58/21 |
| 2003/0071523 A1* | 4/2003 | Silverman | | H02J 7/0021 |
| | | | | 307/150 |
| 2003/0160593 A1* | 8/2003 | Yau | | H02J 7/0018 |
| | | | | 320/116 |
| 2004/0164688 A1* | 8/2004 | Van Tichelen | | H04B 3/54 |
| | | | | 315/292 |
| 2004/0189251 A1* | 9/2004 | Kutkut | | H02J 7/022 |
| | | | | 320/128 |
| 2005/0023054 A1* | 2/2005 | Weidenheimer | | F41B 6/00 |
| | | | | 180/65.25 |
| 2005/0052154 A1* | 3/2005 | Kavounas | | H02J 7/0024 |
| | | | | 320/116 |
| 2005/0068005 A1* | 3/2005 | Yamashita | | H02J 7/0016 |
| | | | | 320/116 |
| 2005/0083016 A1* | 4/2005 | Yau | | H02J 7/0016 |
| | | | | 320/116 |
| 2006/0092583 A1* | 5/2006 | Alahmad | | H02J 7/0024 |
| | | | | 361/15 |
| 2006/0249318 A1* | 11/2006 | Weidenheimer | | F41B 6/00 |
| | | | | 307/17 |
| 2007/0062744 A1* | 3/2007 | Weidenheimer | | F41B 6/00 |
| | | | | 307/71 |
| 2008/0174274 A1* | 7/2008 | Kosaka | | H02J 7/0016 |
| | | | | 320/117 |
| 2009/0079384 A1* | 3/2009 | Harris | | B60L 7/14 |
| | | | | 320/102 |
| 2009/0085553 A1* | 4/2009 | Kumar | | H01M 10/425 |
| | | | | 323/351 |
| 2009/0134851 A1* | 5/2009 | Takeda | | H02M 3/07 |
| | | | | 323/234 |
| 2010/0231162 A1* | 9/2010 | Gibson | | B60L 8/00 |
| | | | | 320/101 |
| 2010/0261043 A1* | 10/2010 | Kim | | H01M 10/4207 |
| | | | | 429/61 |
| 2010/0261048 A1* | 10/2010 | Kim | | H01M 10/44 |
| | | | | 429/150 |
| 2010/0283430 A1* | 11/2010 | Chaturvedi | | H01M 10/441 |
| | | | | 320/134 |
| 2011/0057617 A1* | 3/2011 | Finberg | | H02J 7/0016 |
| | | | | 320/118 |
| 2011/0140526 A1* | 6/2011 | Weidenheimer | | F41B 6/00 |
| | | | | 307/71 |
| 2011/0254514 A1* | 10/2011 | Fleming | | H02M 3/07 |
| | | | | 320/166 |
| 2011/0278929 A1* | 11/2011 | Papastergiou | | H02J 7/35 |
| | | | | 307/43 |
| 2011/0305933 A1* | 12/2011 | Huang | | H01M 2/1022 |
| | | | | 429/97 |
| 2011/0316520 A1* | 12/2011 | Kawahara | | B60L 3/0046 |
| | | | | 323/351 |
| 2011/0316549 A1* | 12/2011 | Coenen | | G01R 31/026 |
| | | | | 324/434 |
| 2012/0013180 A1* | 1/2012 | Muto | | H02J 7/0024 |
| | | | | 307/9.1 |
| 2012/0013304 A1* | 1/2012 | Murase | | H01M 2/202 |
| | | | | 320/116 |
| 2012/0025614 A1* | 2/2012 | Taimela | | H02J 9/062 |
| | | | | 307/65 |
| 2012/0025751 A1* | 2/2012 | Bakas | | H02J 7/35 |
| | | | | 320/101 |
| 2012/0133310 A1* | 5/2012 | Lee | | H02J 7/0024 |
| | | | | 318/139 |
| 2012/0161524 A1* | 6/2012 | Weidenheimer | | F41B 6/00 |
| | | | | 307/71 |
| 2012/0200163 A1* | 8/2012 | Ito | | H02M 7/483 |
| | | | | 307/77 |
| 2012/0249047 A1* | 10/2012 | Kelly | | H01M 10/465 |
| | | | | 320/101 |
| 2012/0256568 A1* | 10/2012 | Lee | | H02J 7/0024 |
| | | | | 318/139 |
| 2012/0274140 A1* | 11/2012 | Ganor | | H01M 10/0445 |
| | | | | 307/71 |
| 2012/0286578 A1* | 11/2012 | Uno | | H02J 7/0014 |
| | | | | 307/77 |
| 2012/0306452 A1* | 12/2012 | Christensen | | H01M 10/441 |
| | | | | 320/136 |
| 2012/0313560 A1* | 12/2012 | Hambitzer | | H01M 10/4207 |
| | | | | 318/139 |
| 2012/0319493 A1* | 12/2012 | Kim | | H01M 10/4207 |
| | | | | 307/80 |
| 2013/0063995 A1* | 3/2013 | Norrga | | H02M 1/32 |
| | | | | 363/125 |
| 2013/0088202 A1* | 4/2013 | Kamata | | H02J 7/0016 |
| | | | | 320/126 |
| 2013/0106356 A1* | 5/2013 | Nakao | | H01M 10/48 |
| | | | | 320/118 |
| 2013/0127419 A1* | 5/2013 | Peter | | H02J 7/0018 |
| | | | | 320/119 |
| 2013/0221878 A1* | 8/2013 | Feuerstack | | H02J 7/0024 |
| | | | | 318/139 |
| 2013/0285456 A1* | 10/2013 | Feuerstack | | H02J 7/0024 |
| | | | | 307/71 |
| 2013/0293165 A1* | 11/2013 | Feuerstack | | H02J 7/0024 |
| | | | | 318/139 |
| 2013/0314045 A1* | 11/2013 | Feuerstack | | H02J 7/0024 |
| | | | | 320/116 |
| 2013/0314046 A1* | 11/2013 | Feuerstack | | H02J 7/0024 |
| | | | | 320/116 |
| 2014/0015488 A1* | 1/2014 | Despesse | | H01M 10/425 |
| | | | | 320/122 |
| 2014/0028266 A1* | 1/2014 | Demetriades | | H02J 3/32 |
| | | | | 320/136 |
| 2014/0070607 A1* | 3/2014 | Weidenheimer | | F41B 6/00 |
| | | | | 307/9.1 |
| 2014/0152240 A1* | 6/2014 | Adest | | H02J 1/102 |
| | | | | 320/107 |
| 2014/0159671 A1* | 6/2014 | Kawahara | | B60L 3/0046 |
| | | | | 320/134 |
| 2014/0312828 A1* | 10/2014 | Vo | | H01M 10/4257 |
| | | | | 320/103 |
| 2014/0368041 A1* | 12/2014 | Tu | | B60L 58/40 |
| | | | | 307/52 |
| 2015/0048783 A1* | 2/2015 | Albertus | | H01M 2/345 |
| | | | | 320/107 |
| 2015/0108990 A1* | 4/2015 | Coenen | | G01R 31/026 |
| | | | | 324/426 |
| 2015/0130421 A1* | 5/2015 | Bevilacqua, III | | H02J 7/0016 |
| | | | | 320/122 |
| 2015/0380959 A1* | 12/2015 | Chang | | H02J 7/0019 |
| | | | | 320/118 |
| 2016/0043579 A1* | 2/2016 | Finberg | | H02J 7/0016 |
| | | | | 320/116 |
| 2016/0064968 A1* | 3/2016 | Lee | | H02J 7/0016 |
| | | | | 320/118 |

(56) References Cited

U.S. PATENT DOCUMENTS

| | | | | |
|---|---|---|---|---|
| 2016/0149421 A1* | 5/2016 | White | H01M 10/441 |
| | | | | 320/121 |
| 2016/0211680 A1* | 7/2016 | Ganor | H02J 7/00 |
| 2016/0380445 A1* | 12/2016 | He | H02J 3/30 |
| | | | | 320/107 |
| 2017/0054306 A1* | 2/2017 | Vo | H01M 10/4257 |
| 2017/0063108 A1* | 3/2017 | Wang | H02J 7/0016 |
| 2017/0123014 A1* | 5/2017 | Goetz | H02M 7/483 |
| 2017/0163170 A1* | 6/2017 | Tahata | H02J 5/00 |
| 2017/0217318 A1* | 8/2017 | Kowalewski | B60L 58/18 |
| 2018/0043789 A1* | 2/2018 | Goetz | H02J 7/1423 |
| 2018/0159316 A1* | 6/2018 | Aramaki | H02H 7/12 |
| 2018/0212440 A1* | 7/2018 | Depond | H02J 3/28 |
| 2018/0219390 A1* | 8/2018 | Tkachenko | H02J 7/0024 |
| 2018/0219478 A1* | 8/2018 | Gotz | H02J 7/0065 |
| 2018/0364311 A1* | 12/2018 | De Breucker | G01R 31/389 |
| 2018/0366959 A1* | 12/2018 | Coenen | H02J 7/0019 |
| 2018/0375348 A1* | 12/2018 | Weyen | G01R 31/36 |
| 2019/0103750 A1* | 4/2019 | Kristensen | H02J 7/0026 |
| 2019/0109470 A1* | 4/2019 | Ganor | B60L 58/21 |
| 2019/0214832 A1* | 7/2019 | Li | H02J 7/0024 |
| 2019/0214833 A1* | 7/2019 | Li | G01R 19/16542 |
| 2019/0222034 A1* | 7/2019 | Stuart | H01M 10/425 |
| 2019/0229540 A1* | 7/2019 | Lee | H02J 7/0024 |
| 2019/0288520 A1* | 9/2019 | Abdel-Monem | G01R 31/367 |
| 2019/0359067 A1* | 11/2019 | Hu | B60L 58/22 |
| 2020/0028375 A1* | 1/2020 | Ono | H02J 7/0069 |
| 2020/0144830 A1* | 5/2020 | Muenzel | H01M 10/443 |

OTHER PUBLICATIONS

International Search Report and Written Opinion in PCT/EP2016/082650, dated Mar. 21, 2017.
European Examination Report in corresponding European Application No. 16829086.4, dated Feb. 24, 2020.

* cited by examiner

DEVICE AND METHOD FOR THE RECONFIGURATION OF A RECHARGEABLE ENERGY STORAGE DEVICE INTO SEPARATE BATTERY CONNECTION STRINGS

The present invention relates to a device and method for the reconfiguration of a rechargeable energy storage such as batteries, hybrids such as LiCaps, ultracapacitors or supercapacitors, fuel cells or similar.

BACKGROUND OF THE INVENTION

Battery packs comprising battery cells can suffer from a low voltage of individual cells, from example, from approximately 1.2 V for a NiMH battery to 3.7 V for a Li-ion battery. Battery packs can be arranged to connect individual cells in series or parallel to attain a sufficiently high voltage, for example to a few hundred volts.

In some applications such as stationary storage applications, a dc-dc converter is necessary to connect the battery to a higher voltage dc-bus of e.g. a grid connected inverter or a dc-grid. In other applications the dc-dc converter is omitted and the battery pack is directly connected to the dc-bus of e.g. the electric motor of an electric vehicle.

Batteries age due to different aging mechanisms such as contaminated materials, Lithium plating of the anode, dendritic growth between battery electrodes, loss of electrolyte due to chemical breakdown or leaks, electrolyte dry-out, dissolving of cathode material, moisture ingress due to vent failure or case seal failure, cracks in the active materials or the cell case, etc. The different aging mechanisms result in a reduction in cell capacity and cell power after prolonged cycling of the battery pack.

The usable battery capacity decreases because the discharging or charging process of the battery pack will be dictated by the worst cells in the pack. In order to respect the State of Charge (SoC) limits of the worst cells, the discharging or charging process of the entire battery pack is stopped when the worst cells reach their minimum or maximum SoC. Other cells in the battery pack will not have reached their maximum or minimum SoC, when there is the forced stop of the discharging or charging process.

The usable power can also decrease as the internal resistance of some cells can increase with aging more than the other cells in the battery pack.

If the battery is reconfigured into different batteries and if at least one of the batteries is used in combination with a dc-dc converter, the voltage decrease due to the reconfiguration of the battery into different batteries can be compensated by the dc-dc converter. Depending on the current rating of the dc-dc converter and the battery, the dc-dc converter can partially compensate for the loss of power due to the decreased battery pack voltage.

If all batteries can be reconnected to a dc-dc converter of sufficient current rating, no loss of power will occur.

If the battery is reconfigured into different batteries and no dc-dc converter is available, the impact on the available power depends on the dc-bus requirements of the e.g. a connected motor inverter.

If the voltage level of the reconfigured battery exceeds the minimum voltage requirement of the inverter, the inverter will be able to produce the required AC-voltage level by e.g. increasing the pulse width of the PWM signal. Evidently, the battery current will increase in order to deliver the same amount of AC-power due to the decreased battery voltage.

If the voltage level of the reconfigured battery is lower than the voltage requirement of the inverter, the maximum AC-voltage produced by the inverter will decrease and hence the maximum inverter power will decrease as the current rating of the inverter cannot exceed its maximum value. Electric motors attached to the inverter will be forced to operate earlier in flux weakening, resulting in less available torque above the nominal speed.

The following example of a battery pack with reduced usable capacity is given in FIG. 1 and will be used throughout as means for comparison between different reconfigurable circuits. The battery pack consists of six modules 10.1 . . . 10.6 connected in series, each battery module 10.1 . . . 10.6 having a battery cell 9.1 . . . 9.6 and a load 48. Three battery modules are in excellent condition (modules 10.2, 10.4, 10.6) and are able to store e.g. 2 kWh each, while the remaining modules (modules 10.1, 10.3, 10.5) are in a poor condition and are able to store e.g. 1 kWh each. The usable battery capacity is thus limited to 6 kWh as the poor battery modules can only discharge or charge to 1 kWh.

Known systems reconfigure battery cells by connecting the cell to the adjacent cells or by bypassing the adjacent cells. Division of the pack into two or more separate packs is possible but the packs would exist of adjacent or bypassed cells. No flexibility in the allocation of the cells into different packs is possible.

SUMMARY OF THE INVENTION

Embodiments of the present invention provide a system for reconfiguration of a rechargeable energy storage device from a pack into two or more subpacks. Each subpack is made up of one or more connection strings of modules. Each module comprises one or more cells. This reconfiguration has the advantage that the two separate subpacks can provide different capacities and currents or voltages so that the two or more subpacks can drive different loads and have different purposes. This can extend the usefulness of a rechargeable energy storage device.

In embodiments of the present invention a rechargeable energy storage device can comprise a plurality of energy storage modules, each energy storage module having one or more energy storage cells and a network of banks of switches, a first bank of switches being adapted to connect an energy storage module in a first series connection string with other energy storage modules to form a first subpack, a second bank of switches being adapted to connect an energy storage module in a second connection string with other energy storage modules to form a second pack, and a first bypass switch adapted to exclude an energy storage module from the first series connection string.

The rechargeable energy storage device preferably has means for isolating all modules of the first connection string from the second connection string with switches.

The ability to rearrange the components of a string provides the advantage that the contents of the strings can be determined independently from the actual physical position in the subpack. Also the arrangement in identical modules increases scalability. The first subpack can be modules connected in series, and the second pack can be modules connected in series or in parallel.

Accordingly, the second subpack can be a second series connection string in which case a second bypass switch is provided that is adapted to exclude an energy storage module from the second series connection string. This also provides the advantage that the contents of the strings can be determined independently from the actual physical position in the pack.

Alternatively the second subpack can be second connection string with modules connected in parallel. This provides a high current/low voltage output.

The first subpack comprising the first series connection string can be connected to a first load and the second subpack comprising the second connection string can be connected to a second load. This allows a rechargeable energy storage device to be used in a different application hence extending the usable life thereof. In particular, the voltage rating of the first load can be the same or different from the voltage rating of the second load.

The first subpack comprising the first series connection string and the second subpack comprising the second connection string can be connected in parallel to the same load. This allows greater flexibility in how power is provided to the load.

The first subpack comprising the first series connection string and the second subpack comprising the second connection string can be connected to a dc-dc or dc-ac converter. This allows compensation for any loss or lowering of voltage.

One of the first subpack comprising the first series connection string and the second subpack comprising the second connection string can be connected to a first load and the dc-dc or dc-ac converter connected to the other of the first series connection string and the second connection string can be connected to a second load. This allows compensation for any loss or lowering of voltage. In particular, the voltage rating of the first load can be different from the voltage rating of the second load.

The first subpack comprising the first series connection string and the second subpack comprising the second connection string can each be connected to first and second dc-dc or dc-ac converters, respectively and connected in parallel to the same load. This allows flexibility in configuring the rechargeable energy storage device.

The first subpack comprising the first series connection string and the second subpack comprising the second connection string can be connected to cascaded dc-dc or dc-ac converters. This also allows flexibility in configuring the rechargeable energy storage device.

The first bypass switch and/or the first or second bank of switches can comprise first controllable switches, the system further comprising a controller for controlling the first controllable switches. The second bypass switch can be a second controllable switch, the system further comprising a controller for controlling the second controllable switch. This allows automatic reconfiguration of the rechargeable energy storage device.

The first and/or second controllable switches can be dynamically controllable to assign one or more modules to the first or second connection string. Preferably means to isolate any module from either the first or second connection string is provided. This allows automatic reconfiguration of the rechargeable energy storage device.

Preferably, a diagnostic test circuit is provided for testing or for deriving for one or more modules any of SoC (State of Charge), SoH (state of health), current, voltage, impedance, impedance spectrum or similar.

The switches for use in embodiments of the present invention are preferably active or controllable switches. Examples of active or controllable switches can be TRIACs or transistors such as bipolar transistors, or MOSFETs.

The rechargeable energy storage device can be adapted to control transfer of energy from one module to another module, e.g. by control of the switches.

In any of the embodiments, the modules can be battery modules and the cells are then battery cells, but the modules can also be battery-hybrids such as LiCaps, ultracapacitors or supercapacitors, fuel cells or similar. This indicates that the system is useful for a wide variety of applications.

The present invention also provides a method for reconfiguring a rechargeable energy storage device from a pack into two or more subpacks comprising connection strings, the rechargeable energy storage device comprising a plurality of energy storage modules, each energy storage module having one or more energy storage cells and switches, the method comprising:
connecting an energy storage module to a first series connection string in series with other energy storage modules, connecting an energy storage module in a second connection string with other energy storage modules, the second connection string being a second series connection string or a second parallel connection string.

The method also includes the step of modules of the first connection string being isolated by switches from the second connection string.

The method can include bypassing an energy storage device to exclude the energy storage module from the first series connection string.

The second connection string can be a second series connection string, further comprising bypassing an energy storage module to exclude the energy storage module from the second series connection string.

The method can include adjusting the output voltage of any or all of the first series connection string and the second connection string with a dc-dc or dc-ac converter.

The method can include adjusting the first output voltage of one of the first series connection string and the second connection string with a first dc-dc or dc-ac converter and cascading the adjusted first output voltage with a second output of the other of the first series connection string and the second connection string and a second dc-dc or dc-ac converter.

The method can include dynamically assigning one or more modules to the first or second connection string.

The method can include diagnosing or deriving for one or more modules any of SoC, SoH, current, voltage, impedance, impedance spectrum.

The method can include isolating one or more modules from either the first or second connection strings.

The method can be adapted to control transfer of energy from one module to another module, e.g. by control of the switches.

The present invention also provides a controller for reconfiguration of a rechargeable energy storage device from a pack into two or more subpacks comprising connection strings, the rechargeable energy storage device comprising a plurality of energy storage modules, each energy storage module having one or more energy storage cells and a first and second bank of switches, the controller being adapted to control the first and second bank of switches so as to:
connect an energy storage module in a first series connection string with other energy storage modules, and/or
connect an energy storage module in a second connection string with other energy storage modules, and/or to exclude an energy storage module from the first series connection string.

The controller can be adapted to control the first and second bank of switches so as to: connect an energy storage module in a first series connection string with other energy storage modules, and/or connect an energy storage module in a second connection string with other energy storage modules, and/or to exclude an energy storage module from the first series connection string.

The controller can be adapted to control bypassing an energy storage device to exclude the energy storage module from the first series connection string.

The controller can be further adapted to control bypassing an energy storage module to exclude the energy storage module from the second series connection string.

The controller can be further adapted to control adjustment of the output voltage of any or all of the first series connection string and the second connection string by controlling a dc-dc or dc-ac converter.

The controller can be further adapted to control adjustment of the first output voltage of one of the first series connection string and the second connection string by controlling a first dc-dc or dc-ac converter and cascading the adjusted first output voltage with a second output of the other of the first series connection string and the second connection string by controlling a second dc-dc or dc-ac converter.

The controller can be further adapted to control dynamically assigning one or more modules to the first or second connection string.

The controller can be further adapted for diagnosing or deriving for one or more modules any of SoC, SoH, current, voltage, impedance, impedance spectrum.

The controller can be further adapted to control isolating one or more modules from either the first or second connection strings.

The controller can be adapted to control transfer of energy from one module to another module.

The present invention can also provide a computer program product comprising software code segments, which when implemented on a processing engine, executes any of the methods of the present invention. The computer program product can be stored on a non-volatile and a non-transitory machine readable signal storage device.

DETAILED DESCRIPTION OF THE INVENTION

Figure 1:
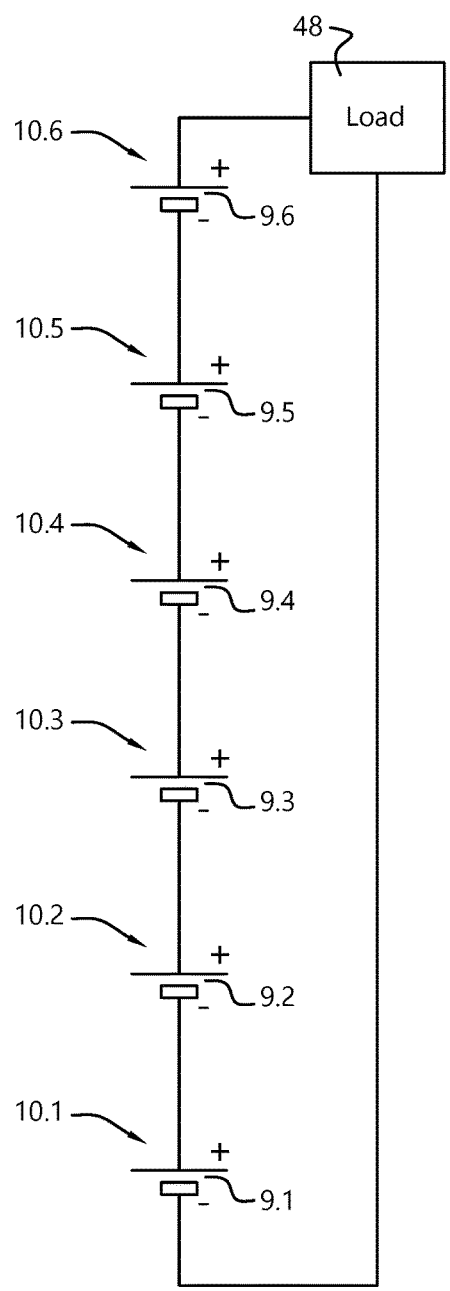
FIG. 1 shows a known battery pack with a series string of 6 modules (or cells).

Embodiments of the present invention allow a reconfiguration of a rechargeable energy storage system such as a battery pack or supercapacitor or ultracapacitor pack, electric double-layer capacitor (EDLC) pack, a hybrid pack such as a LiCap pack, or a fuel cell pack into two or more new capacitor or battery or fuel cell subpacks arranged in "connections", e.g. series or parallel strings. A LiCap or lithium-ion capacitor is a hybrid electrochemical energy storage device which combines the intercalation mechanism of a lithium ion battery with the cathode of an electric double-layer capacitor (EDLC). Each pack of rechargeable energy storage devices such as ultracapacitors or supercapacitors, or hybrids such as LiCaps or fuel cells or battery cells includes rechargeable energy storage modules. In accordance with embodiments of the present invention, in each rechargeable energy storage module, which can include one or more capacitors or fuel cells or battery cells, there is arranged a network of banks of switches. A first bank of switches is arranged to connect a rechargeable energy storage module in a first series connection string with other rechargeable energy storage modules to form a first subpack. A second bank of switches is arranged to connect a rechargeable energy storage module in a second connection string with other rechargeable energy storage modules to form a second subpack. A first bypass switch is arranged to exclude a rechargeable energy storage module from the first series connection string when the first bypass switch is activated. The second connection can be a second series connection string. A second bypass switch can be arranged to exclude a rechargeable energy storage module from the second series connection string when the second bypass switch is activated. Alternatively, the second connection string can be a parallel connection string rather than a second series connection string.

The switches for use in embodiments of the present invention are preferably controllable switches. Examples of controllable switches can be TRIACs or transistors such as bipolar transistors, or MOSFETs.

Embodiments of the present invention can use a characterisation of different rechargeable energy modules. If the parameters of the rechargeable energy modules are within an acceptable range, no action need be taken and the modules can remain in a single series or parallel connection string. If the parameters of the rechargeable energy modules deviate beyond the allowed range, some of the rechargeable energy modules can be reconfigured into one or more separate subpacks comprising modules connected in strings with separate terminals. Each rechargeable energy module can be connected to either one or any of the strings so there is no need to sacrifice certain modules when a particular configuration of the modules is required. However, modules can be excluded from any battery subpack if this is required.

The minimum size of each string expressed in number of cells of rechargeable energy modules put in parallel and/or series, needs to be determined. A rechargeable energy module can be a single cell and its switches, but this can increase the complexity and cost as more switches need to be controlled with respect to each cell. On the other hand a rechargeable energy module can comprise several cells in series and/or parallel, but this decreases the flexibility as all the cells in the same rechargeable energy module remain connected to the same battery subpack. Thus the number of cells in a rechargeable energy module can be chosen depending on a compromise between flexibility on the one hand and cost and complexity on the other hand.

Systems according to embodiments of the present invention can be equipped with the necessary measurement or diagnostic or control tools. For example a tool to measure module characteristics can be included, e.g. some modules or preferably each module can be equipped with, or can be connected to a diagnostic circuit such as an impedance spectroscope, and/or an impedance meter and/or a current and/or voltage meter, e.g. a central tester or meter. This measurement equipment does not necessarily have to be dedicated to the battery system. The measurement equipment can be part of the BMS (battery management system). The BMS can be adapted to transfer the measurement data to the battery system subsequently. Embodiments according to the present invention can obtain relevant measured data from the BMS as required or have their own embedded diagnostics.

Systems according to embodiments of the present invention can also be equipped with a supervisory controller. For example, systems according to embodiments of the present invention can have a supervisory controller for control of any, some or all of the switches. Control of such switches and their operation allows systems according to embodiments of the present invention to assign rechargeable energy storage modules to any one or either one of rechargeable energy storage strings or subpacks or can allow them to be bypassed if necessary.

The supervisory controller in any system according to embodiments of the present invention can also equipped with the necessary electronic processing power/CPU to calculate certain rechargeable energy storage device characteristics, for example battery characteristics such as internal resistance, state-of-charge (SoC) and state-of-health (SoH) based, for instance on the measured voltage and current or any other measurement value mentioned above. The supervisory controller for any or all of the embodiments can also equipped with the necessary software, i.e. computer program products which, when executed on a processing engine is able to determine which rechargeable energy storage modules should be connected to one string or another or which rechargeable energy storage modules should be bypassed.

Any system according to embodiments of the present invention can also be equipped with the necessary non-volatile memory and/or non-transitory signal storage medium to store the measured values such as voltage/current, to store the calculated module characteristics, and, for example the previous position of the switches in function of the required power and other parameters such as SoC.

A system according to embodiments of the present invention can also be equipped with the necessary communication hardware and software to communicate with external devices and systems e.g. the motor of the EV or the Energy Manager of a household of the maximum available power and energy. This information can also be relayed to the user, owner or aggregator such that he/she can track the condition of the rechargeable energy storage device such as a battery.

Accordingly, the supervisory controller can be adapted to control the first and second bank of switches so as to: connect an energy storage module in a first series connection string with other energy storage modules to form a first subpack, and/or connect an energy storage module in a second connection string with other energy storage modules to form a second subpack, and/or to exclude an energy storage module from the first series connection string or from the second connection string. The switches for use in embodiments of the present invention are preferably controllable switches. Examples of controllable switches can be TRIACs or transistors such as bipolar transistors, or MOSFETs.

The supervisory controller can be adapted to control bypassing an energy storage device to exclude the energy storage module from the first series connection string.

The supervisory controller can be further adapted to control bypassing an energy storage module to exclude the energy storage module from the second series connection string.

The supervisory controller can be further adapted to control adjustment of the output voltage of any or all of the first series connection string and the second connection string by controlling a dc-dc or dc-ac converter.

The supervisory controller can be further adapted to control adjustment of the first output voltage of one of the first series connection string and the second connection string by controlling a first dc-dc or dc-ac converter and cascading the adjusted first output voltage with a second output of the other of the first series connection string and the second connection string by controlling a second dc-dc or dc-ac converter.

The supervisory controller can be further adapted to control dynamically assigning one or more modules to the first or second connection string.

The supervisory controller can be further adapted for diagnosing or deriving for one or more modules any of SoC, SoH, current, voltage, impedance, impedance spectrum.

The supervisory controller can be further adapted to control isolating one or more modules from either the first or second connection strings.

In the following, embodiments of the present invention will be described with reference to batteries with battery cells, but the present invention also includes other rechargeable energy storage devices such as supercapacitors or ultracapacitors, or hybrids like LiCaps or fuel cells. In each embodiment describing batteries and battery cells, the same embodiments with supercapacitors or ultracapacitors, or hybrids like LiCaps or fuel cells are herewith explicitly disclosed. In embodiments of the present invention reference can be made to a dc-dc converter. Instead of a dc-dc converter a connection to a dc-ac inverter or any other load is included within the scope of the invention. In each embodiment describing dc-dc converters, the same embodiments with dc-ac converters is herewith explicitly disclosed.

First Embodiment

In this embodiment of the present invention a battery system is provided (as an example of a rechargeable energy system) to allow a reconfiguration of a battery pack into two or more new battery subpacks comprising "connection strings". Each battery pack or subpack includes battery modules 10. The battery modules 10 are arranged in a ladder circuit with switches. In this embodiment, each rung of the ladder circuit comprises wires linking two switches in series between two connection strings. Between every other pair of rungs of the ladder circuit, one or more battery cells 9 are connected in a battery module 10. In each string, one bypass switch 5, 8 is connected in parallel with the one or more battery cells 9 of that module 10. In each battery module 10, which can include one or more battery cells 9, there is arranged a network of banks of switches. A first bank of switches is arranged to connect a battery module 10 in a first series connection with other battery modules 10. A second bank of switches is arranged to connect a battery module 10 in a second series connection with other battery modules 10. A first bypass switch 5 is arranged to exclude a battery module 10 from the first series connection when the first bypass switch 5 is activated. A second bypass switch 8 is arranged to exclude a battery module 10 from the second series connection when the second bypass switch 8 is activated.

Figure 2:
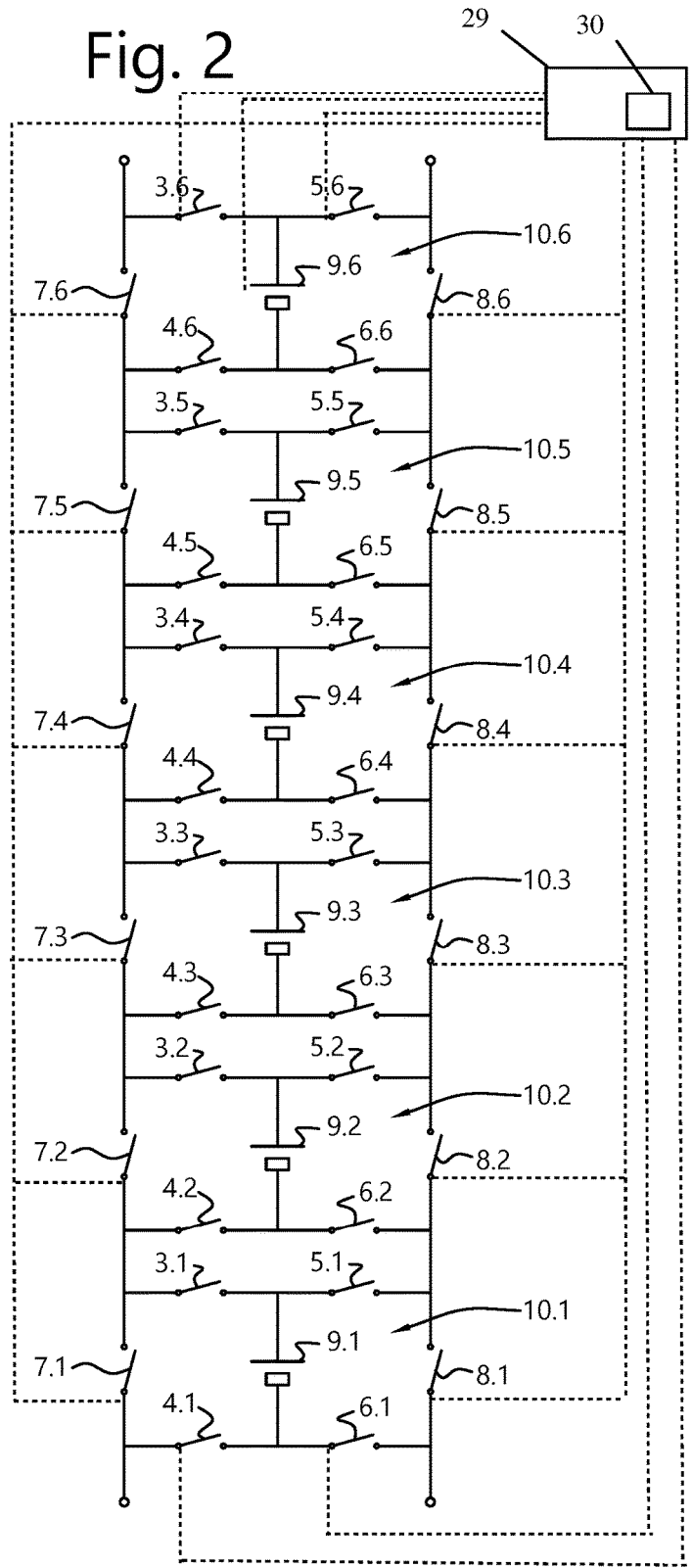
FIG. 2 shows an embodiment of the present invention having the addition of a network of switches to allow reconfiguration of a battery pack into two or more subpacks.

With reference to FIG. 2, the battery modules 10.1 to 10.6 are arranged in a ladder network with one or more energy storage cells such as battery cells 9.1 ... 9.6, in each module. In each module 10, there can be six switches 3-8 (e.g. 3.1 ... 3.6; 4.1 ... 4.6; 5.1 ... 5.6, 6.1 ... 6.6; 7.1 ... 7.6; 8.1 ... 8.6) for example which are arranged in the first and second banks of switches. The first bank has a first set of switches 3, 4 used to connect a battery module 10.1 ... 6 to the "first/left" series connection string −1+1. In the second bank, a second set of switches 5, 6 are used to connect a battery module 10.1 ... 6 to the "second/right" series connection string −2+2. A first bypass switch 7 is activated when a battery module 10.1 ... 6 is to be excluded from the first series connection string −1+1. A second bypass switch 8 is activated when a battery module 10.1 ... 6 is to be excluded from the second series connection string −2+2.

The battery modules 10.1 ... 6 are put in one, two or a number of series connection strings, whereby two strings are shown in FIG. 2. This allows the connection of one battery module 10.1 ... 6 to other battery modules 10.1 ... 6 to form a battery subpack. It is not necessary that adjacent battery modules 10.1 ... 6 in one connection string are physically neighbouring battery modules 10.1 ... 6 in the battery pack before reconfiguration or in any subpack. Each battery module 10.1 ... 6 can be assigned to one of the number of series connection strings by closing the appropriate switches.

Figure 3:
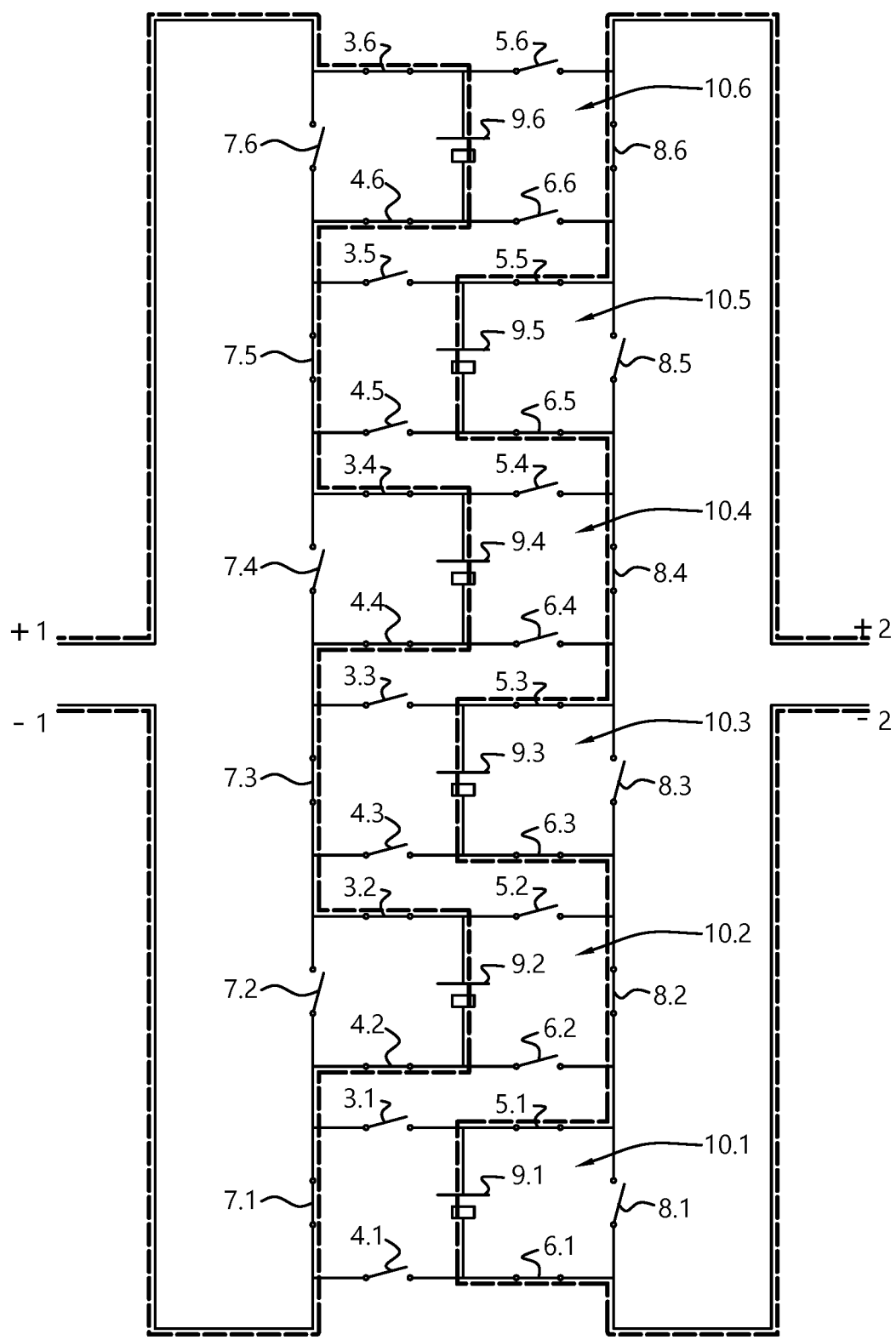
FIG. 3 shows a further embodiment of the present invention providing reconfiguration of a battery pack into two battery subpacks using a switching network.

For example, a first string can be made with some of the modules, e.g. a first battery subpack connection string −1+1 is made with battery modules 10.2, 10.4 and 10.6, the respective connection switches 3.2, 4.2; 3.4, 4.4; 3.6, 4.6 of these battery modules 10.2, 10.4 and 10.6 are closed and the first bypass switches 7.1, 7.3, 7.5 of the other modules 10.1, 10.3, 10.5 are closed to exclude these from this battery connection string −1+1. To make a second battery connection string −2+2 with some of the modules, e.g. modules 10.1, 10.3 and 10.5, the respective connection switches 5.1, 5.3, 5.5; 6.1, 6.3, 6.5 of these battery modules are closed and the second bypass switches 8.2, 8.4; 8.6 of the other battery modules 10.2, 10.4, 10.6 are closed as they are not part of this battery connection string −2+2. This is shown in FIG. 3 where the switching network has been activated to reconfigure the battery pack into two separate battery subpacks comprising modules connected in strings. FIG. 3 illustrates the ladder network, modules 10.1-10.6, the switches 3-8 and the energy storage cells 9.1-9.6 as previously described. Battery module connection string −1+1 connects a number of modules, e.g. battery modules 10.2, 10.4 and 10.6 forming a first battery string with a first set of terminals, while battery module connection string 2+2 connects battery modules 10.1, 10.3 and 10.5 into a second battery string with a second set of terminals. As the worst modules have been removed from the series connection string −1+1, modules 10.2, 10.4, 10.6 are now able to deliver the available 2 kWh, resulting in a first battery pack connection string −1+1 of 6 kWh. The second battery pack connection string −2+2 with battery modules 10.1, 10.3, 10.5 can still deliver 1 kWh per module, resulting in a second battery of 3 kWh. The total usable energy content of both battery subpacks has now increased from the previous 6 kWh to the current 9 kWh. The maximum current in battery subpack connection string −1+1 can also increase as the battery modules with the highest resistance (modules 10.1, 10.3, 10.5) have been removed from the first battery subpack connection string −1+1. This embodiment allows the connection of non-adjacent cells into separate connection strings as shown in FIG. 3.

Figure 4:
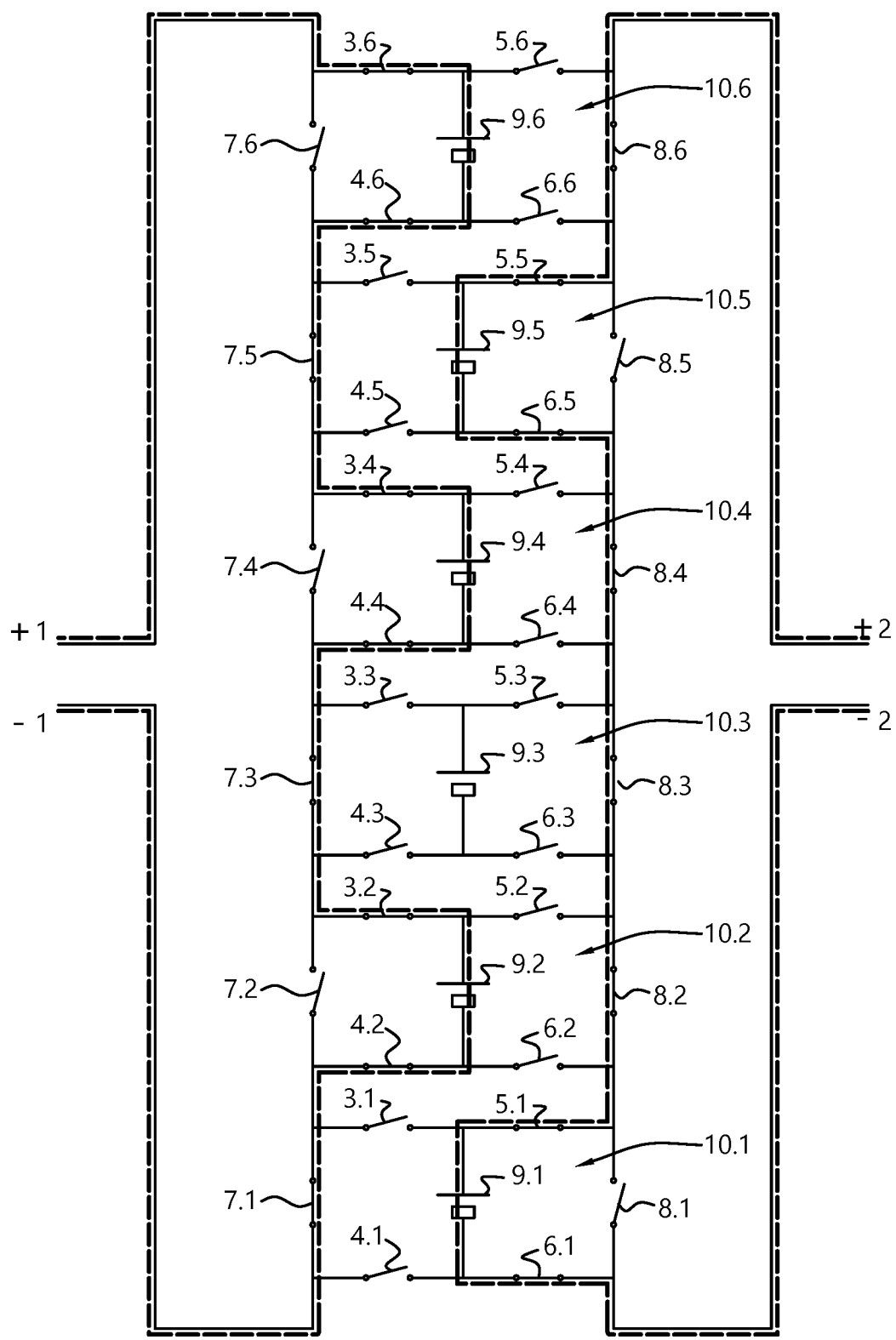
FIG. 4 shows a further embodiment of the present invention providing bypassing of faulty module by opening the connection switches at both sides and closing bypass switches.

Note that in accordance with embodiments of the present invention a battery module 10 has to be in one string or the other or it can be removed from any string if at least two of the switches are closed, e.g. both bypass switches are closed as shown in FIG. 4. FIG. 4 illustrates the ladder network, modules 10.1-10.6, the switches 3-8 and the energy storage cells 9.1-9.6 as previously described. Activating the switches 7 and 8 allows the bypassing of the worst performing or faulty cells to further improve the usable energy content. FIG. 4 illustrates a module 10.3 which is a faulty module and module 10.1 needs to be connected to module 10.5 bypassing module 10.3 to form the second connection string −2+2 comprising modules 10.1 and 10.5. If the faulty module cannot be bypassed, the usable energy content of the connection string −2+2 is reduced to 0 as module 10.3 cannot accept any charge and cannot discharge. If module 10.3 is bypassed, modules 10.2 and 10.5 become available to deliver a combined usable energy content of 2 kWh. The bypassing can easily be achieved by opening the switches

3.3, 4.3, 5.3, 6.3 of module 10.3 and closing the bypass switch 7.3 and 8.3 of module 10.3. The total available battery capacity is now 8 kWh-6 kWh from battery subpack string −1+1 and 2 kWh from battery subpack string −2+2. Without the bypassing only the 6 kWh from battery subpack string −1+1 would be available.

As previously mentioned, this embodiment can make use of characterisation of modules. If the parameters of the modules are within an acceptable range, no action need be taken and the modules can remain in a single series connection string. If the parameters of the modules deviate beyond an allowed range, the system i adapted to reconfigure part of the modules into one or more connection strings each string forming a separate battery subpack with separate terminals. Each module 10.1-10.6 can be connected to either one of the connection strings −1+1 or −2+2, so there is no need to sacrifice certain modules when a particular configuration of the modules is required, but on the other hand modules can be isolated from presence in any string.

This embodiment, as all embodiments, can be equipped with the measurement tools to measure module characteristics, e.g. some modules or each or every module 10.1-10.6 can be equipped with, or can be connected to a diagnostic circuit such as an impedance spectroscope, and/or an impedance meter and/or a current and/or voltage meter, e.g. a central tester or meter. This measurement equipment does not necessarily have to be dedicated to the battery system. The measurement equipment can be part of the BMS (battery management system). The BMS can be adapted to transfer the measurement data to the battery system subsequently.

The battery system can also be equipped with a supervisory controller 29. The supervisory controller 29 can be adapted to control any of all of the switches 3-8 of the switching network, such that the modules 10.1-10.6 can be assigned to either one of the battery subpack strings −1+1, −2, +2 or bypassed if necessary.

The supervisory controller can also be equipped with the necessary processing power/CPU to calculate certain battery characteristics such as internal resistance, state-of-charge (SoC) and state-of-health (SoH) based on any of the measured values such as the measured voltage and current, impedance, resistance, etc. The supervisory controller can also equipped with the necessary software which, when run on a processing engine is able to determine which modules should be connected to battery subpack string −1+1, which modules should be connected to battery subpack string −2+2 and which modules should be bypassed.

The battery system of this embodiment can also equipped with the necessary memory to store any of the measured values, such as the measured voltage and/or current, impedance, resistance etc. and/or to store the calculated battery characteristics, and the previous position of the switches in function of the required power and other parameters such as SoC.

The battery system of this embodiment can also equipped with the necessary communication hardware and software to inform e.g. the motor of the EV or the Energy Manager of a household of the maximum available power and energy. This information can also be relayed to the user, owner or aggregator such that he/she can track the condition of the battery.

Second Embodiment

Figure 5:
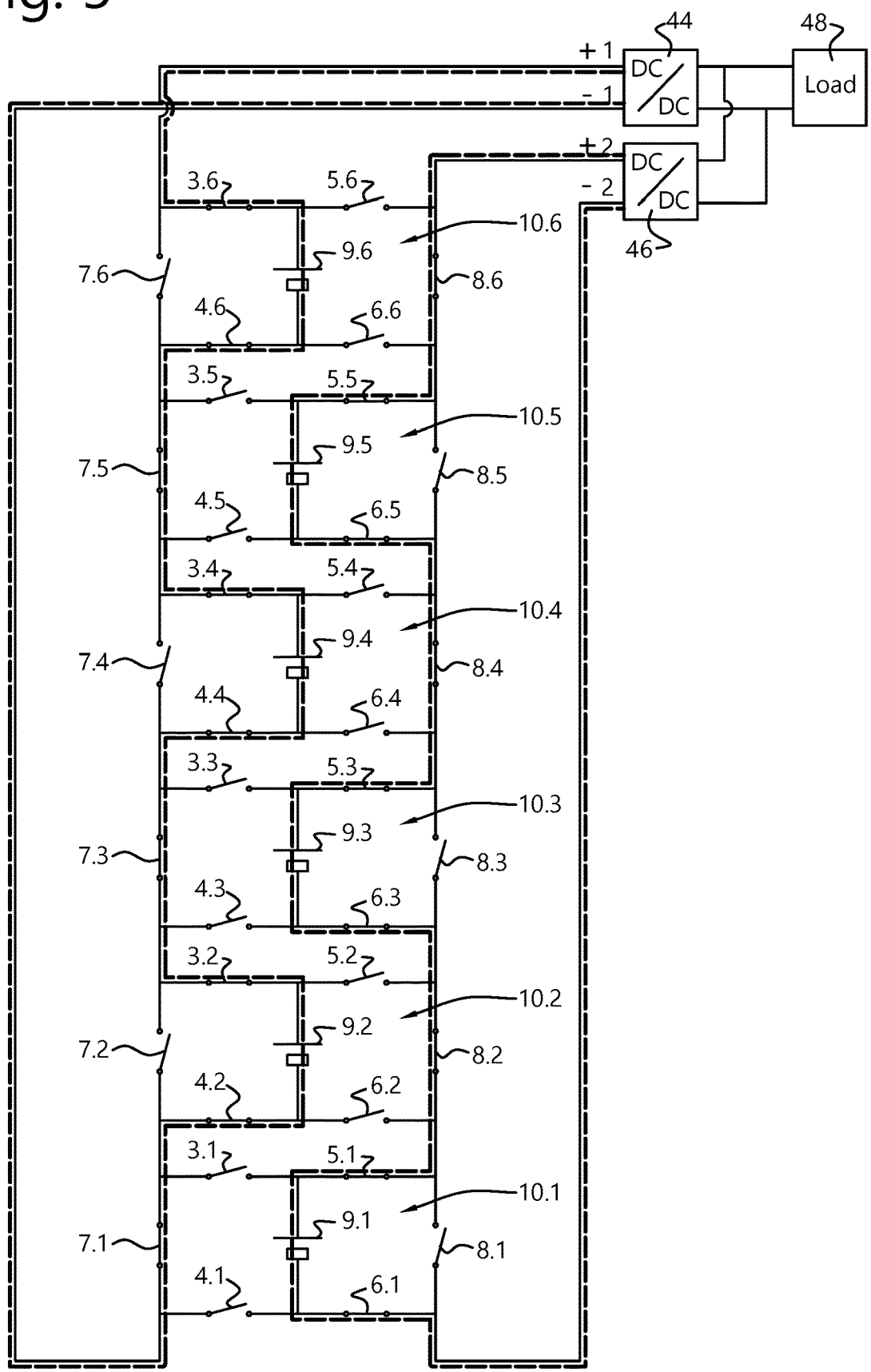
FIG. 5 shows a further embodiment of the present invention providing reconfiguration of a battery pack and connection to two dc-dc converters.

This embodiment of the present invention allows a rechargeable energy storage system such as a battery pack to be subdivided into different subpacks comprising connection strings −1+1 and −2+2 having separate terminals, to be connected to different dc-dc converters, as shown schematically in FIG. 5. The system of FIG. 5 includes the ladder network, modules 10.1-10.6, the switches 3-8 and the energy storage cells 9.1-9.6 as previously described and in addition two dc-dc converters 44 and 46 that can be connected to a load 48.

The system of FIG. 5 allows the different rechargeable energy storage devices such as battery subpacks to supply power to the same load 48 although the voltage provided by the rechargeable energy storage devices comprising one or more strings −1+1, −2+2 is/are too low. For example, for each connection string −1+1, −2+2 there can be a dc-dc converter 44, 46 respectively connected thereto, whereby each dc-dc converter 44, 46 is connected to the same load 48 or one or more separate loads. A benefit is that the usable energy content can be increased as was demonstrated also by the first embodiment. As the voltages of the different of strings −1+1, −2+2, each being a string of a subset of the rechargeable energy modules 9.1-9.6, is lower than the voltage of the original series connection, the available power can:

- Be maintained if the current rating of the dc-dc converter 46 connected to a connection string such as string −2+2 is equal to the current rating of the dc-dc converter 44 connected to connection string −1+1.
- The available power can increase if the current in the original modules 10.1-10.6 was limited due to the internal resistance of one or more of the modules 10.1-10.6 of the second string −2+2. Once the modules in the second string −2+2 are removed from the first string −1+1, the full current is once again available for the first string −1+1.
- The second string −2+2 can be connected to a dc-dc converter 46 with a lower current rating as the increased internal resistance no longer allows the nominal current to flow.
- The available power can decrease significantly if for example the original configuration was six modules 10.1-10.6 connected to a three-phase dc-dc converter, while the reconfiguration results in the first string −1+1 is connected to two of the phases and the second string −2+2 to the third phase. If the first string −1+1 has two thirds of the original voltage and the second string −2+2 has one third of the original voltage, the available power will decrease to 56%. However, the available energy has increased significantly. Some additional switches (not shown) can also be foreseen at the dc-dc converters 44, 46 to allow connection of either of the dc-dc converters 44, 46 to either one of the strings −1+1, −2+2.

Figure 6:
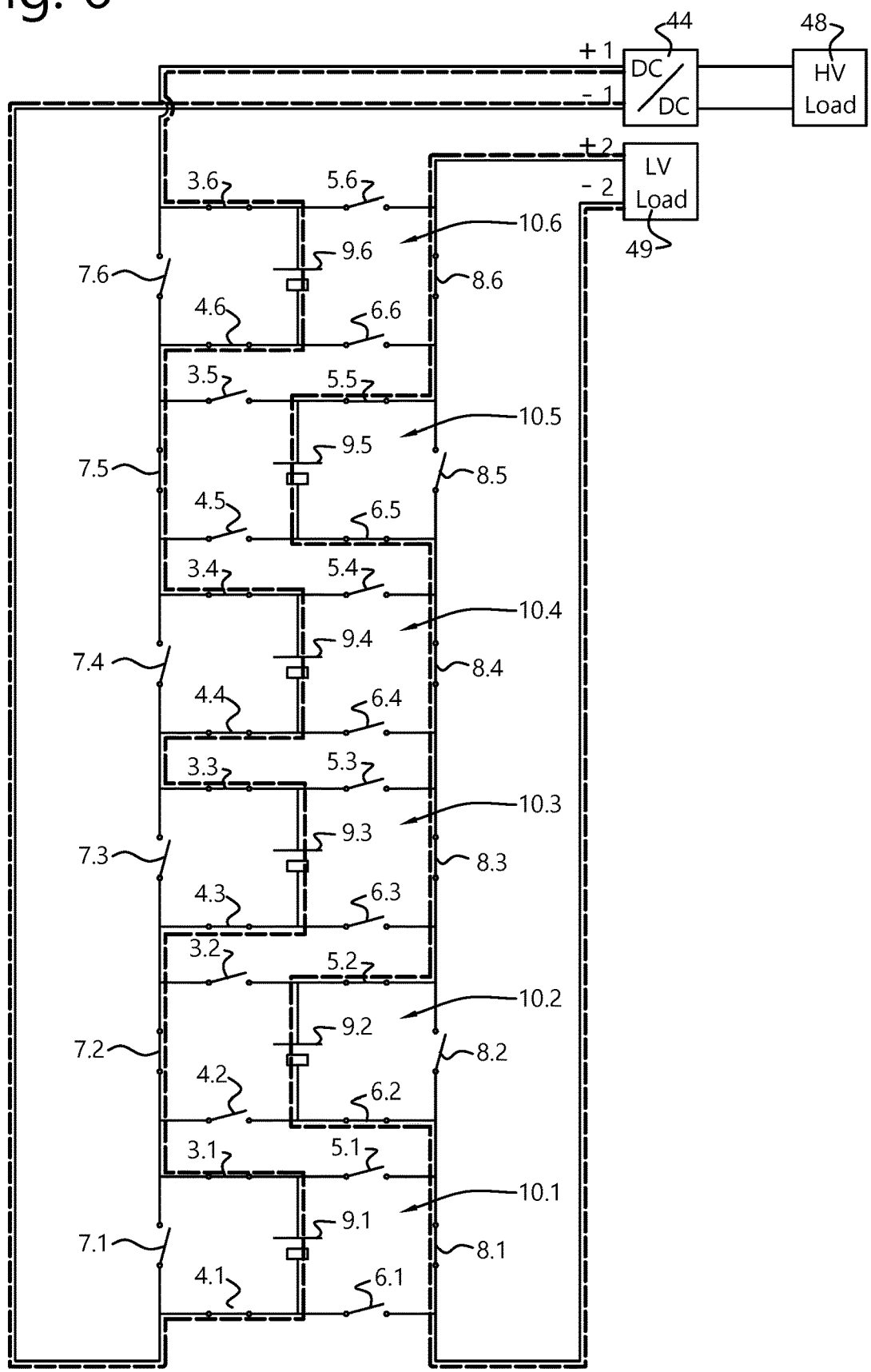
FIG. 6 shows a further embodiment of the present invention providing reconfiguration of a battery pack, with a dc-dc converter connected to a high-voltage load and direct connection to a low-voltage load.

In case only one dc-dc converter 44 is available in the rechargeable energy storage system, the dc-dc converter 44 can remain attached to the first and/or best performing connection string −1+1 to deliver power to e.g. a high-voltage load 48. The dc-dc converter 44 thus compensates the reduced voltage of the first connection string −1+1, although the available power is reduced as the current rating of the dc-dc converter 44 is fixed and there is a voltage decrease of the rechargeable energy storage string −1+1 e.g. battery subpack. The second connection string −2+2, e.g. battery subpack, is available for direct connection to a low-voltage (LV) load 49, see FIG. 6. FIG. 6 illustrates the ladder network, modules 10.1-10.6, the switches 3-8 and the energy storage cells 9.1-9.6 as previously described. There is however only one dc-dc converter 44, and two loads—an HV load 48, and an LV load 49.

An example application of this setup is;

A (plug-in hybrid) electric vehicle which uses the dc-dc converter 44 to provide power to the inverter of its electric motor, while the low voltage battery string −2+2 is connected to the 48 V grid which provides power to the power steering, air-conditioning, etc.

A stationary storage system which uses the dc-dc converter 44 to provide power to a grid-connected inverter, while the low voltage battery string −2+2 is connected to a low-voltage grid load 49 used for infotainment and lighting.

Figure 7:
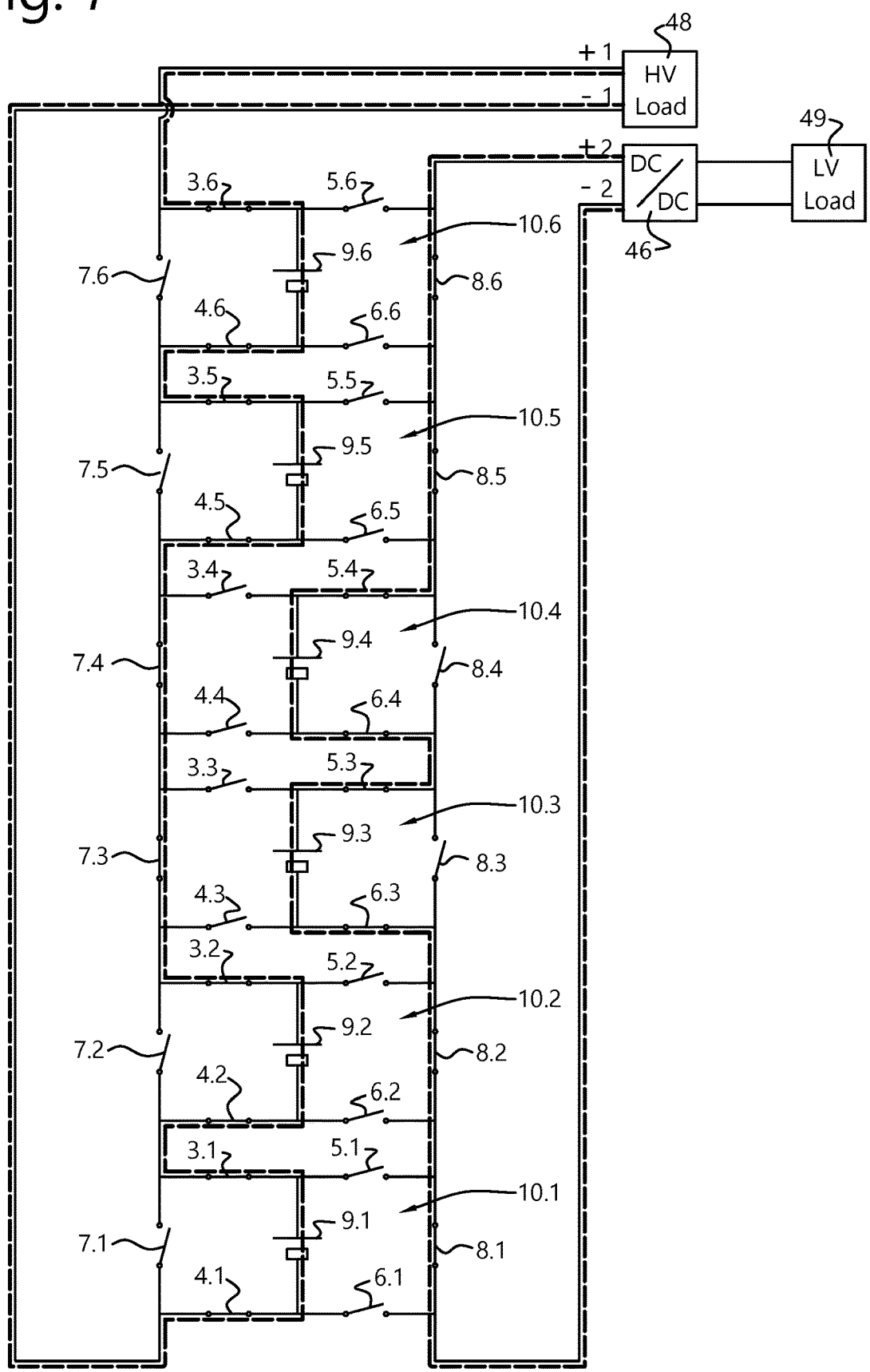
FIG. 7 shows a further embodiment of the present invention providing reconfiguration of a battery pack, with a dc-dc converter connected to a low-voltage load and direct connection to a high-voltage load.

As shown in FIG. 7, the high-voltage load 48 can be directly connected to the first connection string +1−1, while the second connection string −2+2 can be connected to a dc-dc converter 46. This can be a necessary step to match the voltage of the low-voltage load 49 with the voltage of the connection string −2+2. This embodiment can be used, for example, to match the voltage of the connection string −2+2 to a 48 V automotive grid or, for example to a 20 V USB PD grid load. FIG. 7 illustrates the ladder network, modules 10.1-10.6, the switches 3-8 and the energy storage cells 9.1-9.6 as previously described. There is however only one dc-dc converter 46, and two loads—an HV load 48, and an LV load 49.

Figure 8:
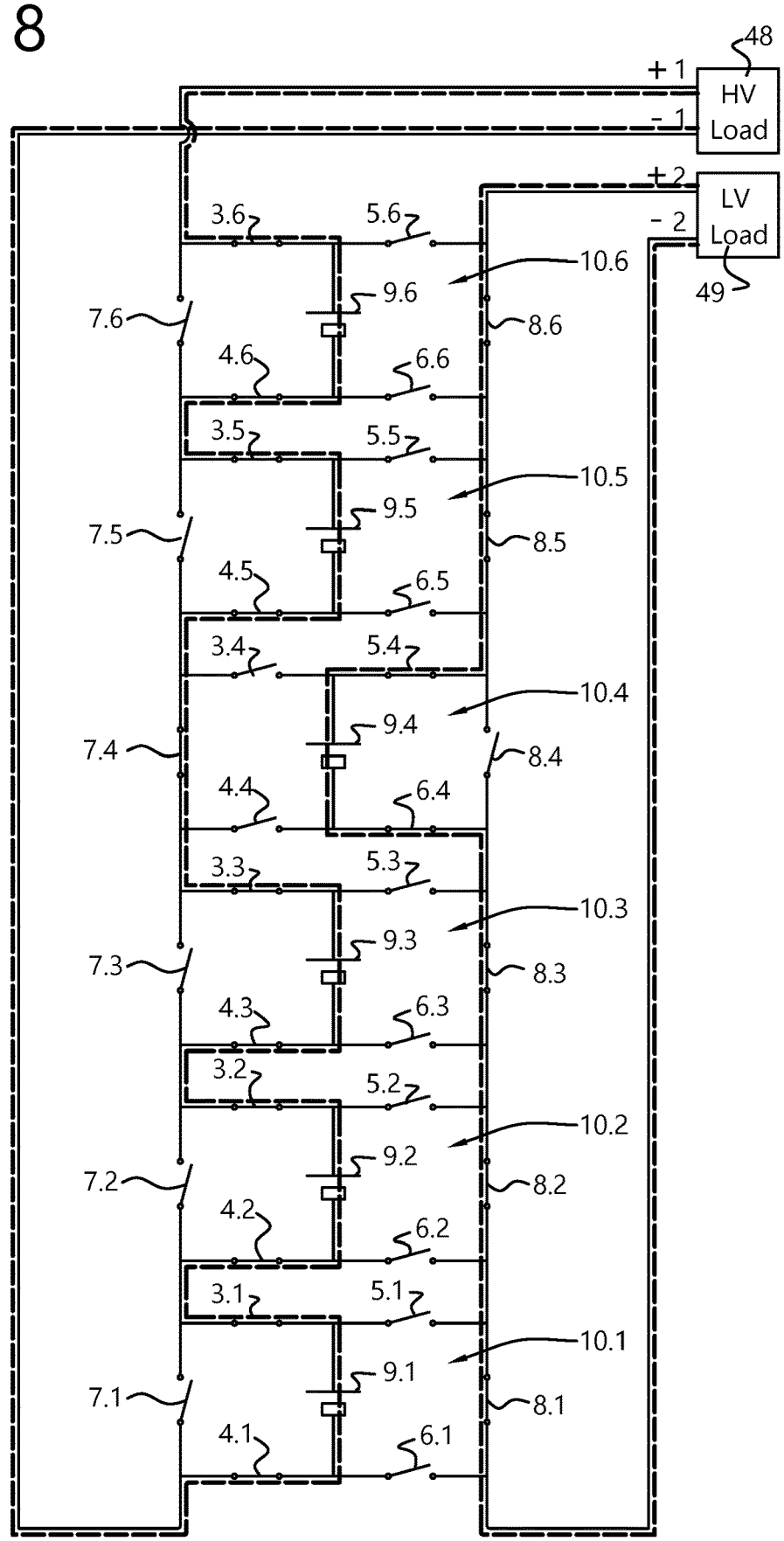
FIG. 8 shows a further embodiment of the present invention providing reconfiguration of a battery pack with a high-voltage load directly connected into a first battery subpack and a low-voltage load directly connected to another battery subpack.

A reconfigurable energy storage system according to any of the embodiments of the present invention can also be deployed when no dc-dc converter is available, see FIG. 8. FIG. 8 illustrates the ladder network, modules 10.1-10.6, the switches 3-8 and the energy storage cells 9.1-9.6 as previously described. There is however no dc-dc converter 44 or 46, but there are two loads—an HV load 48, and an LV load 49.

In this case the first connection string −1+1 can be connected to the high-voltage load 48 and the second connection string 2+2 to a low-voltage load 49. An example could be an electric vehicle with a 450 V battery, 48V dc-grid for its auxiliaries and 400 V dc inverter/electric motor. Connection of part of the battery modules to the 48V dc-grid for the auxiliaries does not affect the operation of the 400 Vdc inverter/electric motor.

Figure 9:
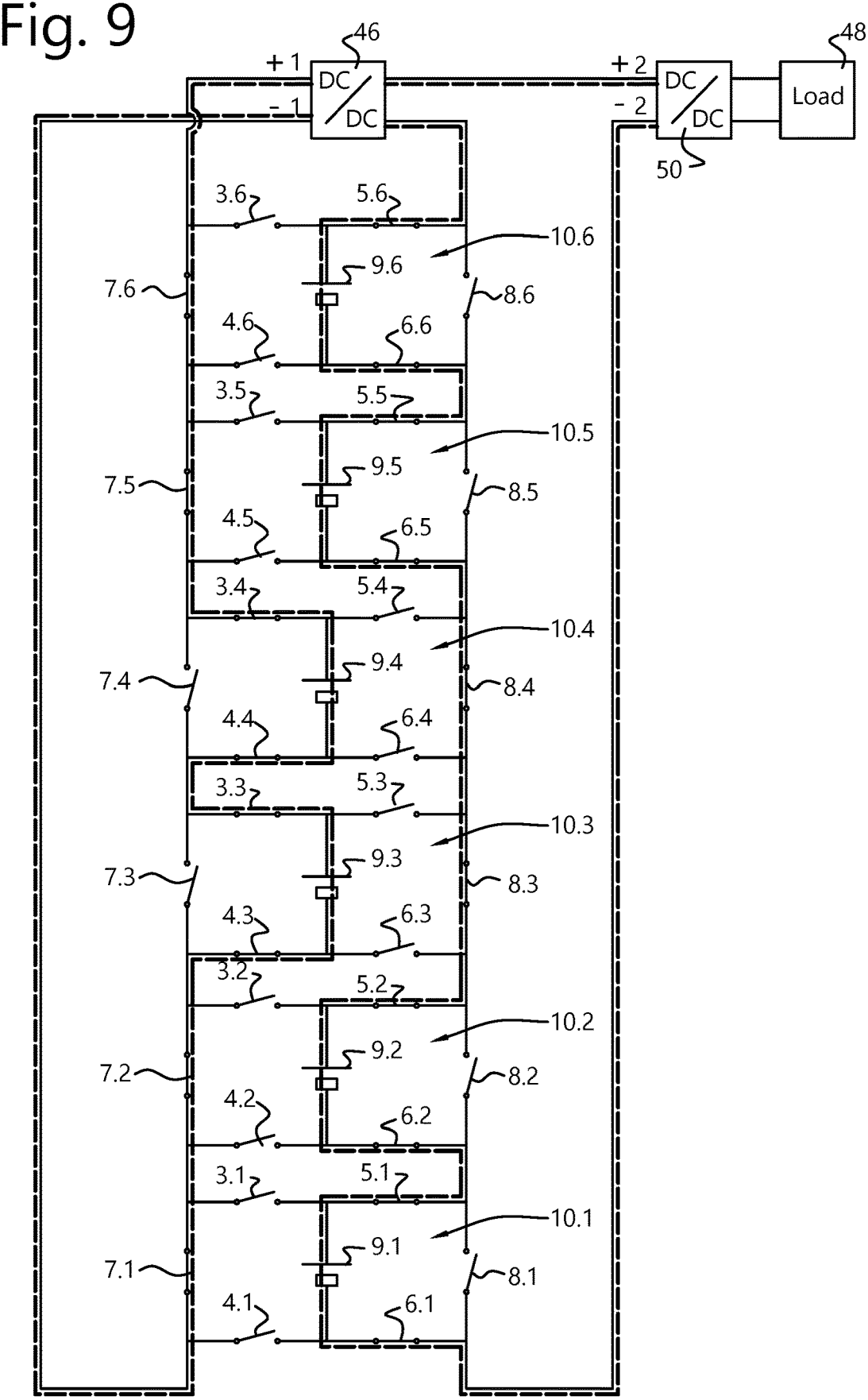
FIG. 9 shows a further embodiment of the present invention providing dc-dc converters in a cascade configuration.

A cascade configuration is shown in FIG. 9. FIG. 9 illustrates the ladder network, modules 10.1-10.6, the switches 3-8 and the energy storage cells 9.1-9.6 as previously described. There are however two dc-dc converters 46, 50 in cascade and one load 48.

This battery system is configured to put both dc-dc converters 46, 50 in cascade. This allows reduction of the current in the second battery pack string −2+2 compared to the current delivered by the first battery string −1+1. As the current supplied by battery string −2+2 is below the current supplied by battery string −1+1, the dc-dc converter 46 of battery pack −2+2 compensates the reduced current by producing an output current identical to the current of battery pack string −1+1. This allows the series connection of the second dc-dc converter 50 with the first battery subpack string −1+1. The voltage ratio of the second dc-dc converter 50 is inversely proportional to the current ratio of both battery subpack strings −1+1, −2+2.

This configuration allows to compensate partly for the voltage decrease in battery subpack string −1+1 due to the loss of the modules connected to in battery subpack string −2+2. As such the cascade connection offers an increased voltage to the load 48 (or its dc-dc converter 50) compared to the situation where only in battery subpack string −1+1 is connected to the load 48 (or its dc-dc converter 44). The power and energy available to the load 48 also increase while the limits of both battery subpack strings −1+1, −2+2 are respected as each battery subpack string −1+1, −2+2 contributes to its own capabilities.

Third Embodiment

Figure 10:
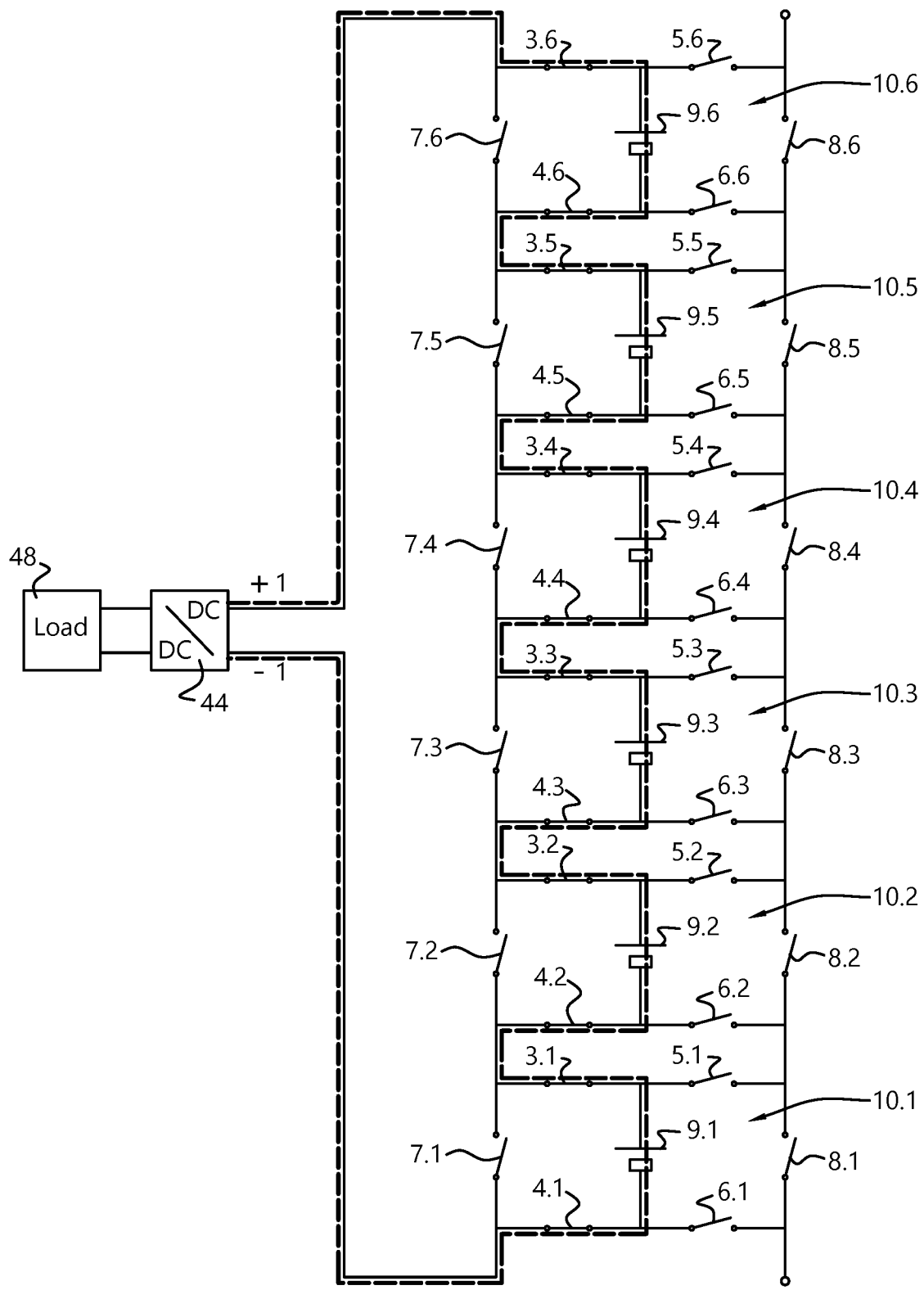
FIG. 10 shows a further embodiment of the present invention providing dynamic battery reconfiguration where all cells are in series at first, while only some cells remain in series after other cells are depleted.

Configuration of a battery according to embodiments of the present invention does not necessarily have to be static. In FIG. 10, modules 10.1 to 10.3 retain a high capacity, while modules 10.4 to 10.6 only have a reduced capacity. FIG. 10 illustrates the ladder network, modules 10.1-10.6, the switches 3-8 and the energy storage cells 9.1-9.6 as previously described with the exception that modules 10.4 to 10.6 differ from modules 10.1 to 10.3 as to capacity. There is one dc-dc converter 44 and one load 48.

At first all modules 10.1 to 10.6 are put into a series connection string −1+1 (as shown) and operated in discharge until the modules 10.4 to 10.6 with the reduced capacity have reached their minimum SoC. Even if e.g. one module reaches its minimum SoC first, this module can be bypassed to allow the series connection of all other modules.

Once modules 10.4 to 10.6 are depleted, the remaining modules 10.1 to 10.3 can remain connected to the available dc-dc converter 44 by bypassing modules 10.4 to 10.6, by closing switches 7.4 and 7.6 while opening switches 3.4 and/or 4.4 and 3.6 and/or 4.6. This allows to deplete the remaining modules 10.4 to 10.6 further until all available energy is spent after which they are bypassed. In this way the usable energy of all modules 10.1 to 10.6 can be used, without exceeding the voltage limits of any module, while allowing smaller modules 10.1 to 10.3 to be used effectively.

This dynamic reconfiguration can also be used depending on the load profile of the load 48. E.g. when an EV drives in town, the battery can first be used with only modules 10.1 to 10.3 as the speed is low and the required inverter voltage is also low. Afterwards the EV drives out of town onto the highway and both the required power and inverter dc-bus voltage increases. As a consequence modules 10.4 to 10.6 are also placed in the series string to increase the voltage and provide power to the vehicle. For this purpose the switches 3-8 are made controllable, e.g. controlled by a controller as explained above.

Fourth Embodiment

This embodiment allows a different way to reconfigure a rechargeable energy storage system such as a pack of battery cells, ultracapacitors or supercapacitors, hybrids like LiCaps, or fuel cells. For example a rechargeable energy storage device such as a battery pack can be reconfigured into e.g. two or more new battery subpack comprising modules connected in strings. Each rechargeable energy storage device includes modules, e.g. a battery pack includes battery modules 20—see FIG. 11. The battery modules 20 are arranged in a double ladder circuit with switches. The rungs of the ladder form "horizontal" connections in the ladders. Each rung of a first ladder circuit comprises wires linking two switches 13, 15 connected in series between two connection wires 32, 34.

Each rung of a second ladder circuit comprises wires linking two switches 14, 16 connected in series between two connection wires 34, 36. Wire 34 will form a first battery subpack connection string −1+1. In a "vertical sense at least some of the switches 15, 16 will act as connection switches in a series circuit −1, +1 whereas at least some of the switches 13, 14 will act as connection switches in a parallel circuit −2, +2. Bypass witches 18.1-18.8 can be used to bypass one or more cells in the series circuit −1, +1.

Between rungs of the first and second ladder circuits, one or more battery cells 19 are connected in each battery module 20. For each module 20, in battery subpack connection string −1+1, one bypass switch 18 is connected in parallel with the one or more battery cells 19 of that module 20. In each battery module 20, which can include one or more battery cells 19, there is arranged a network of banks of switches. A first bank of switches is arranged to connect a battery module 20 in a first battery subpack comprising series connection string −1+1 with other battery modules 20. A second bank of switches is arranged to connect a battery module 20 in a parallel connection with other battery modules 20 to form a second battery subpack connection string −2+2. A bypass switch 18 is arranged to exclude a battery module 20 from the first series connection string −1+1 when the first bypass switch 18 is activated.

Figure 11:
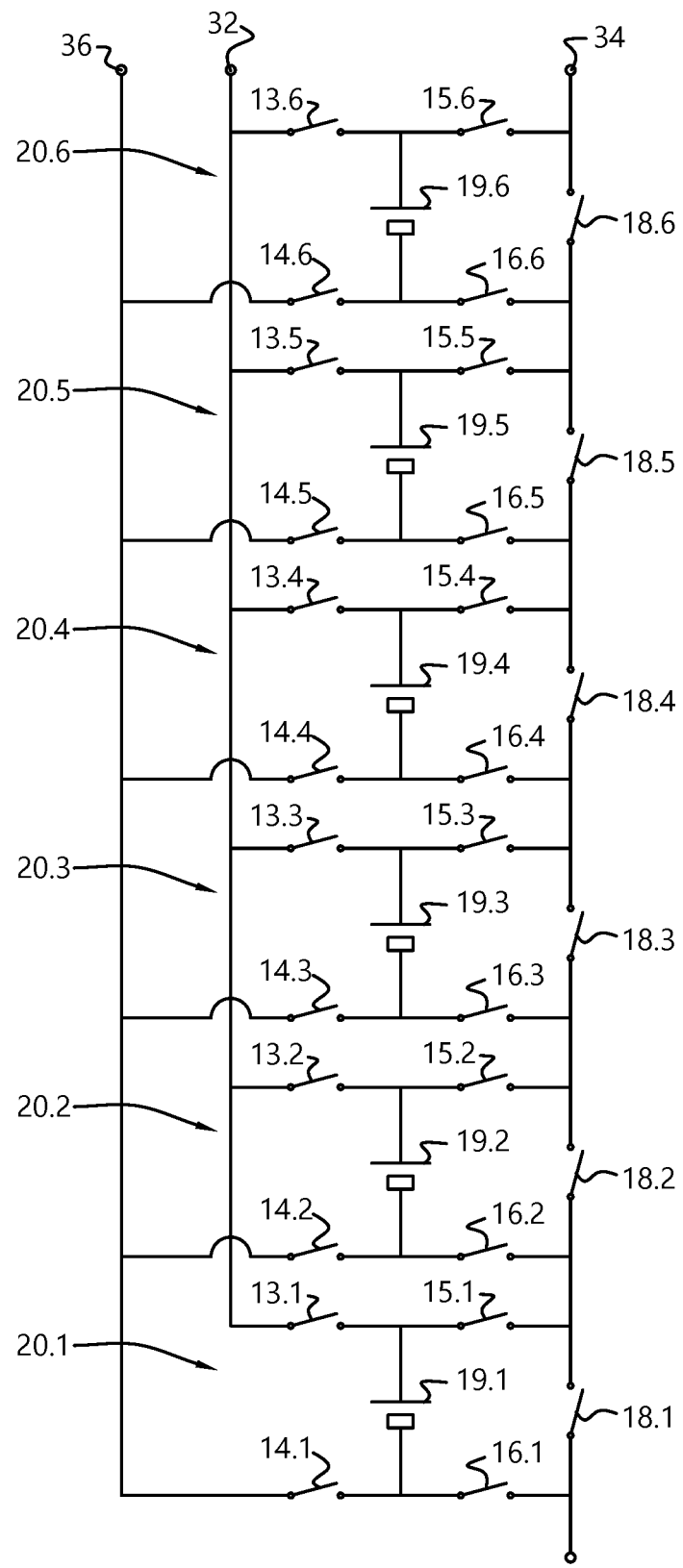
FIG. 11 shows a further embodiment of the present invention providing addition of a network of switches to allow reconfiguration of a battery pack.

As shown in FIG. 11 around each battery module 20 with one or more battery cells 19 a network of five switches is installed. These five switches are used as follows. A first set of switches 15, 16 is used to connect a or any module 20 to the "first/right" series connection string −1+1. If all modules 20 are within certain quality standards or specifications there is no need to reconnect certain modules 20 into a different battery pack. Then all modules 20 can be put in a single battery subpack series string −1+1 which can be connected to a load, optionally with a dc-dc converter between the load and battery subpack series string −1+1. Only the switches 15, 16 are closed in this case, while all other switches 13, 14 are open.

A second set of switches 13, 14 is used to connect a module 20 to a "second/left" parallel connection string −2+2. All modules 20 connected to this second battery subpack parallel string −2+2 are in parallel and at the same voltage. The bypass switch 18 is activated when the module 20 is excluded from the first battery subpack series string −1+1.

Figure 12:
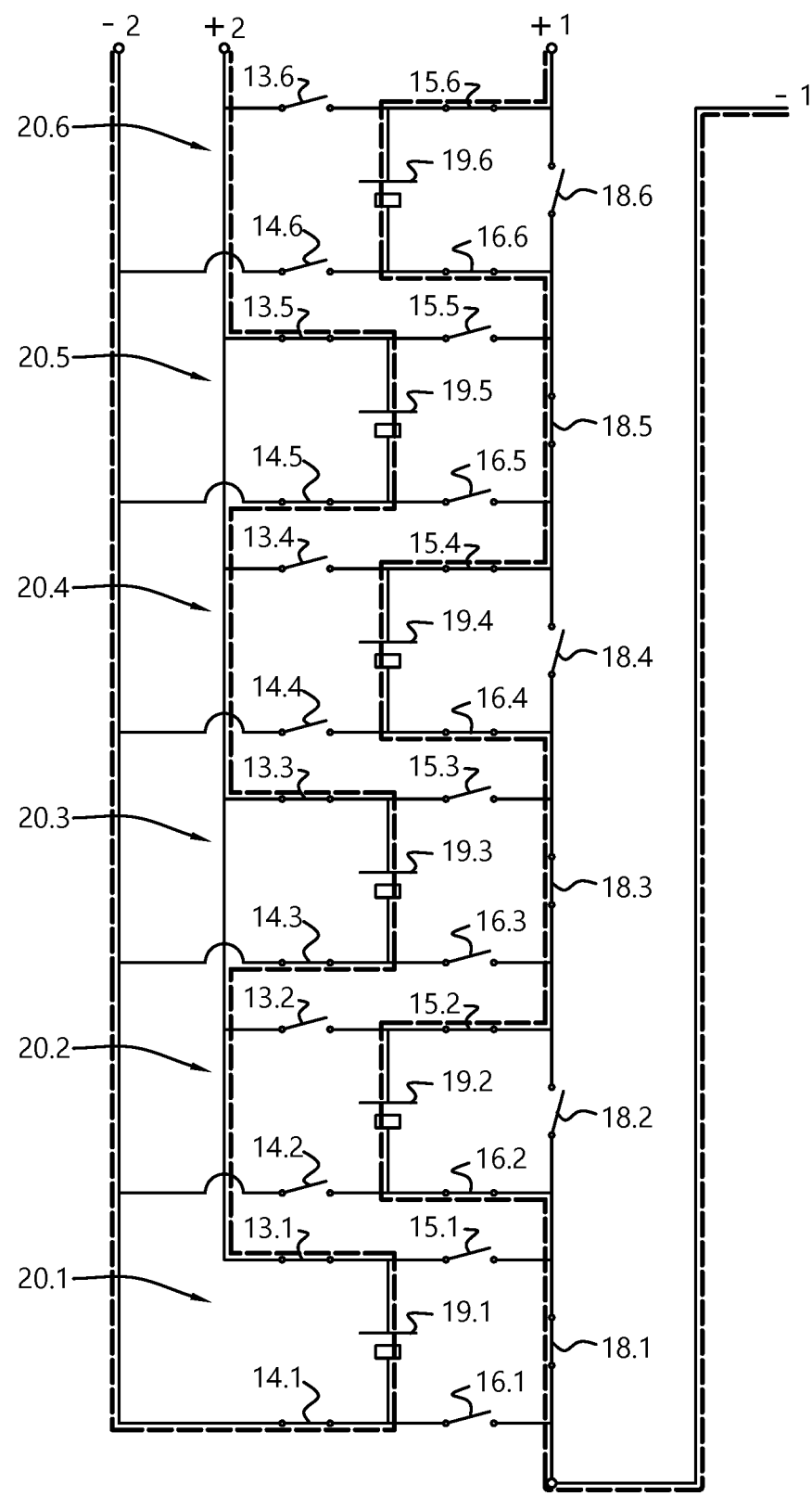
FIG. 12 shows a further embodiment of the present invention providing reconfiguration of a battery pack into two battery subpacks using a switching network.

For example some of the modules may be assigned to a string. Modules 20.2, 20.4, 20.6 are, for example put in a series connection string as shown in FIG. 12. FIG. 12 illustrates the two ladder networks, modules 20.1-20.6, the switches 13-16, 18 and the energy storage cells 19.1-19.6. The embodiment of FIG. 12 allows the connection of one module 20 to other modules 20 in a battery subpack. There is no requirement that adjacent modules 20 in a string are physically subsequent modules in the battery pack before reconfiguration or in a subpack. Each module 20 can be assigned to either the series connected battery subpack string −1+1 or the parallel connected battery subpack string −2+2 by closing the appropriate switches.

For example, a first series connected battery subpack string −1+1 can be made with some of the modules such as modules 20.2, 20.4 and 20.6, by closing the respective connection switches 15.2, 15.4, 15.6; 16.2, 16.4, 16.6 of these modules 20.2, 20.4, 20.6 and close the bypass switches 18.1, 18.3, 18.5 of the other modules 20.1, 20.3, 20.5 as they are not part of this battery subpack connection string −1+1. To make a second parallel battery subpack parallel string −2+2 with some of the modules such as modules 20.1, 20.3 and 20.5, the respective connection switches 13.1, 13.3, 13.5; 14.1, 14.3, 14.5 of these modules are closed. This is shown in FIG. 12, where the switching network has been activated to reconfigure the battery pack into two separate battery subpack strings. Battery subpack string −1+1 connects some of the modules such as modules 20.2, 20.4 and 20.6 into a first series connected battery string with a first set of terminals, while battery subpack parallel string −2+2 connects some of the modules such as modules 20.1, 20.3 and 20.5 into a second parallel battery subpack string with a second set of terminals. As the worst modules have been removed from the series connection string −1+1, modules 20.2, 20.4, 20.6 are now able to deliver the available 2 kWh, resulting in a first battery subpack −1+1 of 6 kWh. The second battery subpack parallel string −2+2 with modules 20.1, 20.3, 20.5 can still deliver 1 kWh per module, resulting in a second battery subpack of 3 kWh. The total usable energy content of both battery subpacks has now increased from the previous 6 kWh to the current 9 kWh. The maximum current in battery subpack string −1+1 can also increase as the modules with the highest resistance (modules 20.1, 20.3, 20.5) have been removed from the first battery subpack string −1+1.

Also this embodiment can use a characterisation of the different modules. If the parameters of the modules are within an acceptable range, no action is taken and all of the modules remain in a single series connection of battery subpack string −1+1. If the parameters of the modules deviate beyond the allowed range, the battery system can be reconfigured to put a part of the modules into one or more separate battery subpacks with separate terminals. Each module 20.1-20.6 can be connected to either one of the battery subpack strings −1+1 or −2+2, so there is no need to sacrifice certain modules when a particular configuration of the modules is required.

The battery system can be equipped with measurement tools to measure module characteristics, e.g. each module is equipped with, or can, be connected to a current and voltage meter or other diagnostic equipment as mentioned above. This equipment does not necessarily have to be dedicated to the battery system of the present invention. The measurement equipment can be part of the BMS (battery management system). The BMS subsequently can transfer the measurement data to the battery system of the present invention.

The system can also be equipped with a supervisory controller. The supervisory controller controls the switches of the switching network, such that the modules can be assigned to either one of the battery subpacks or bypassed if necessary. The supervisory controller can also be equipped with the necessary processing power/CPU to calculate certain battery characteristics such as internal resistance, state-of-charge (SoC) and state-of-health (SoH) based on the measured diagnostic value such as voltage and current, impedance etc. The supervisory controller can also be equipped with the necessary software which is able to determine which modules should be connected to battery subpack connection string −1+1, which modules should be connected to battery subpack connection string −2+2 and which modules should be bypassed.

The battery system can also be equipped with the necessary memory to store the measured voltage/current or other diagnostic measurements, to store the calculated battery characteristics, and the previous position of the switches in function of the required power and other parameters such as SoC.

The battery system can also be equipped with the necessary communication hardware and software to inform e.g. the motor of the EV or the Energy Manager of a household of the maximum available power and energy. This information can also be relayed to the user, owner or aggregator such that he/she can track the condition of the battery.

Fifth Embodiment

Figure 13:
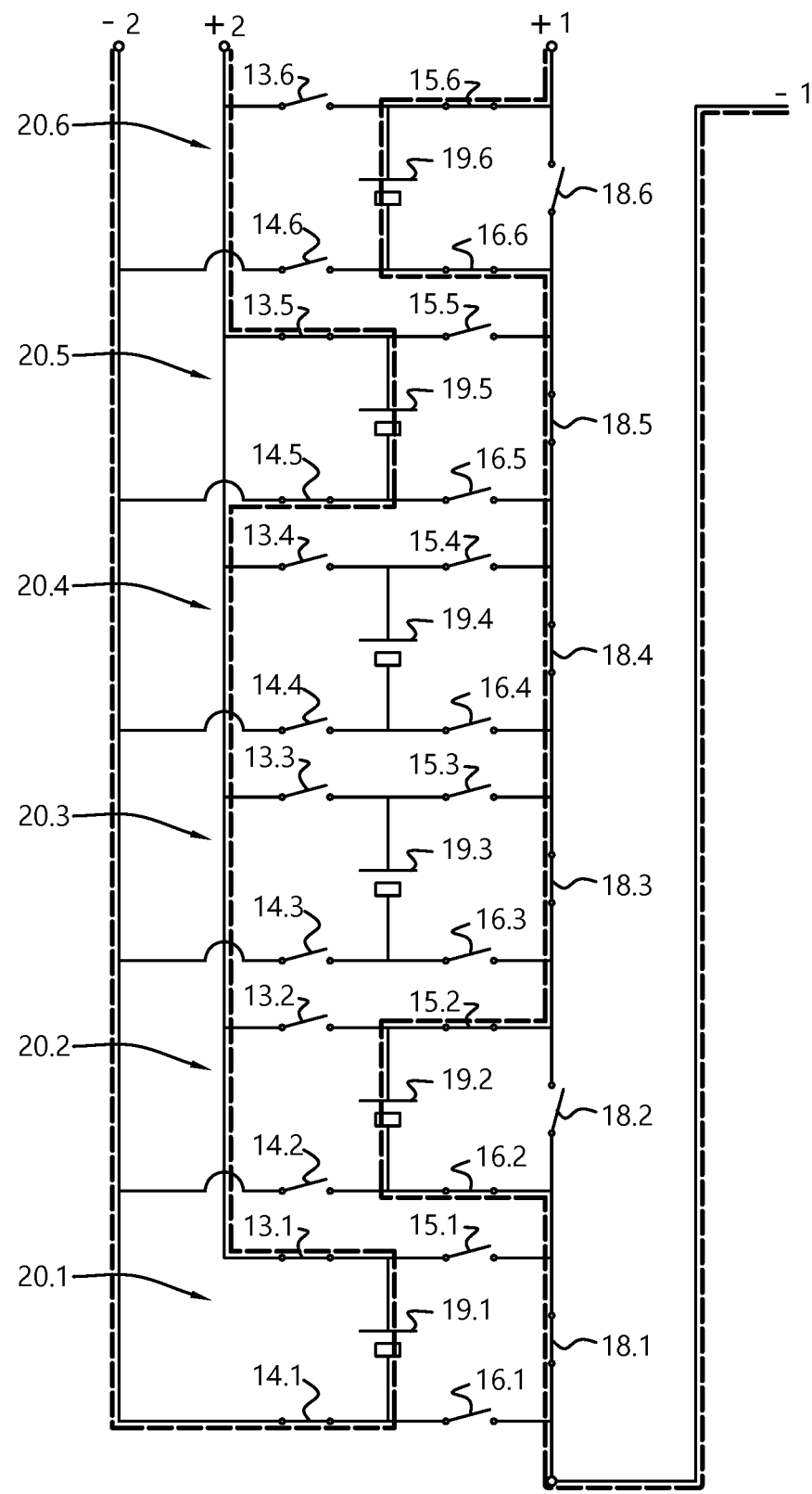
FIG. 13 shows a further embodiment of the present invention providing bypassing of faulty modules.

This embodiment allows the bypassing of the worst performing or faulty cells to further improve the usable energy content. FIG. 13 illustrates the two ladder networks, modules 20.1-20.6, the switches 13-16, 18 and the energy storage cells 19.1-19.6 as previously described. In the circuit shown in FIG. 13, some of the modules such as module 20.3 of the battery subpack parallel connection string −2+2 and some of the modules such as module 20.4 of the battery subpack series connection string −1+1 are faulty modules. Modules. 20.2 and 20.6 are connected in series to form the first battery subpack string −1+1, while module 20.1 and 20.5 are connected in parallel to form the second battery subpack string −2+2. The earlier example with 2 kWh and 1 kWh modules is resumed here. If the faulty modules cannot be bypassed, the usable energy content of the battery subpacks is reduced to 0 as module 20.3 and 20.4 cannot accept any charge and cannot discharge. If modules 20.3 and 20.4 are bypassed, the available energy in battery subpack string −1+1 increases from 0 to 4 kWh, while the available energy in battery subpack string −2+2 increases from 0 to 2 kWh. The bypassing of module 20.3 can easily be achieved by opening the switches 13.3, 14.3 of segment 20.3, while the bypassing of module 20.4 is achieved by opening the switches 15.4, 16.4 of module 20.4 and closing the bypass switch 18.4 of module 20.4. The total available battery capacity is now 6 kWh.

Sixth Embodiment

Figure 14:
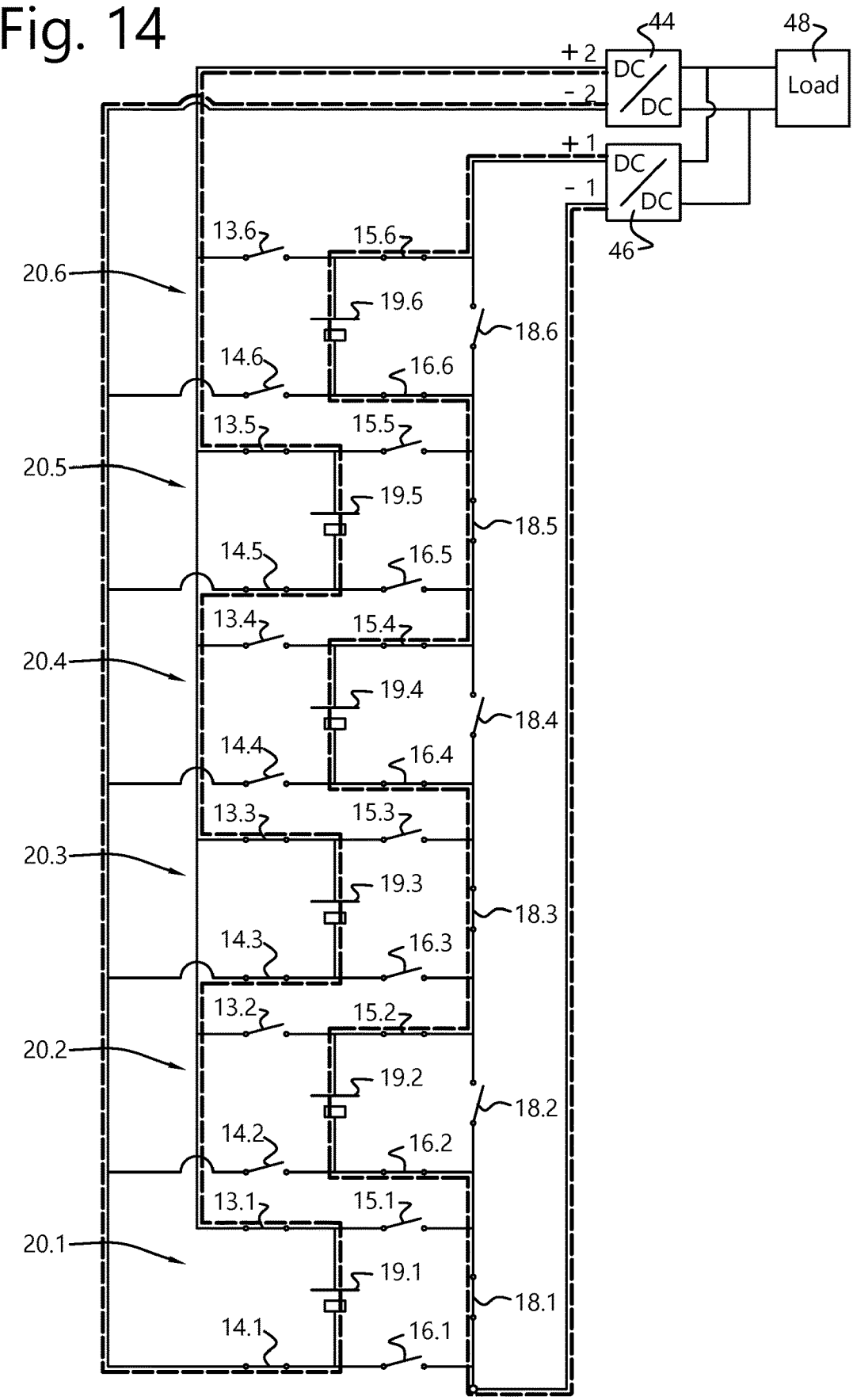
FIG. 14 shows a further embodiment of the present invention providing reconfiguration of the battery pack and connection to two dc-dc converters.

This embodiment not only allows the battery pack to be subdivided into different battery subpack connection strings, e.g. into battery subpack connection strings −1+1 and −2+2 having separate terminals, but also the circuit can include connection to different dc-dc converters, see FIG. 14. FIG. 14 illustrates the two ladder networks, modules 20.1-20.6, the switches 13-16, 18 and the energy storage cells 19.1-19.6 as previously described as well as two dc-dc converters 44 and 46 and a load 48. This allows the different battery subpack connection strings −1, +1; −2, +2 to supply power to the same load 48 although the voltage of both battery subpack connection strings −1, +1; −2, +2 is different. In an alternative both dc-converters, 44, 46 can also be connected to a separate load or separate loads. The benefit is that the usable energy content of the overall battery has increased as demonstrated earlier.

A battery subpack can also be constructed when no dc-dc converter is available (not shown). In this case the first battery subpack series connected string −1+1 can be connected to the high-voltage load 48 and the second battery subpack parallel connected string −2+2 can be connected to a low-voltage load 49. An example application could be an electric vehicle with a 450 V battery, 48V dc-grid for its auxiliaries and 400 Vdc inverter/electric motor. The disconnection of part of the battery to the 48V dc-grid for the auxiliaries does not affect the operation of the 400 Vdc inverter/electric motor.

Figure 15:
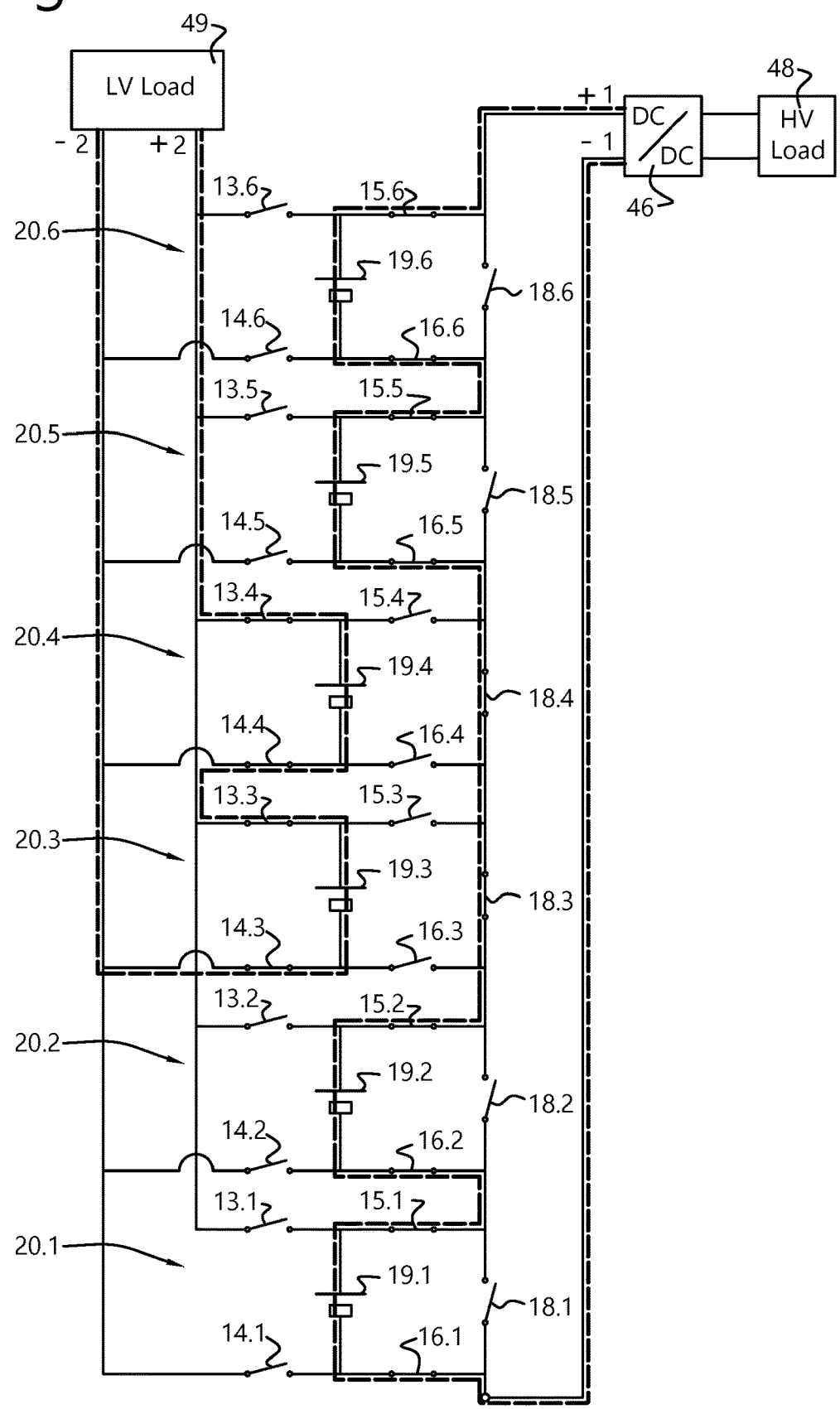
FIG. 15 shows a further embodiment of the present invention providing reconfiguration of a battery pack, with a dc-dc converter connected to high-voltage load and direct connection to low-voltage load.

In case only one dc-dc converter is available in the circuitry, a dc-dc converter 44 can remain attached to the first/best performing battery subpack connection string −1+1 to deliver power to e.g. a high-voltage load 48. The dc-dc converter 44 thus compensates the reduced voltage of the first battery subpack connection string −1+1, although the available power is reduced as the current rating of the dc-dc converter 44 is fixed and the battery voltage decreases. The second battery subpack connection string −2+2 is available for direct connection to a low-voltage (LV) load 49, see FIG. 15. FIG. 15 illustrates the two ladder networks, modules 20.1-20.6, the switches 13-16, 18 and the energy storage cells 19.1-19.6 as previously described as well as one dc-dc converter 46 and two loads 48, 49.

An example application of this setup could be;
A (plug-in hybrid) electric vehicle which uses the dc-dc converter to provide power to the inverter of its electric motor, while the low voltage battery is connected to the 48 V grid which provides power to the power steering, air-conditioning, etc.
A stationary storage system which uses the dc-dc converter to provide power to a grid-connected inverter, while the low voltage battery is connected to a low-voltage grid used for infotainment and lighting.

Another possibility is that the high-voltage load 48 is directly connected to the first battery subpack connection string +1−1, while the second battery subpack connection string −2+2 is connected to a dc-dc converter (not shown). This can be a necessary step to match the voltage of the low-voltage load 49 with the voltage of battery subpack connection string −2+2. This case can be applicable to the cases mentioned above, i.e. to match the voltage of battery pack string −2+2 to a 48 V automotive grid or to a 20 V USB PD grid.

Seventh Embodiment

Figure 16:
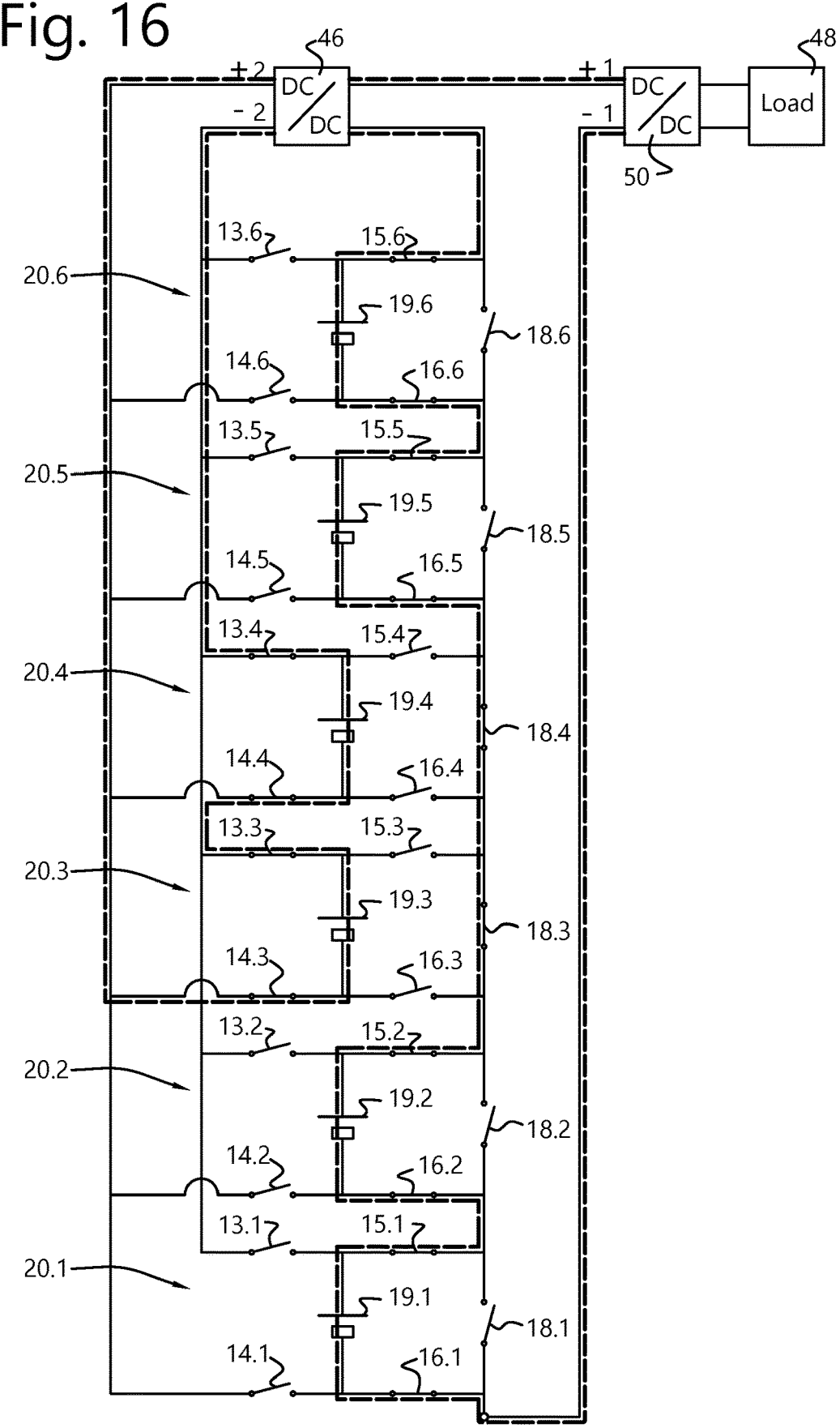
FIG. 16 shows a further embodiment of the present invention using dc-dc converters in a cascade configuration.

This embodiment allows a configuration having dc-dc converters 46, 50 in cascade. The cascade configuration is shown in FIG. 16. FIG. 16 illustrates the two ladder networks, modules 20.1-20.6, the switches 13-16, 18 and the energy storage cells 19.1-19.6 as previously described as well as two dc-dc converters 46 and 50 and a load 48. This allows reduction of the current per module 20 in the second battery subpack connection string −2+2 compared to the current delivered by the modules 20 in battery subpack connection string −1+1. As the power delivered per module by battery subpack connection string −2+2 is below the power delivered per module of battery subpack connection string −1+1, the dc-dc converter 46 of battery subpack connection string −2+2 compensates the reduced power delivered per module 20 by producing an output current identical to the current of battery subpack connection string −1+1. This allows the series connection of the second dc-dc converter 50 with the first battery subpack connection string −1+1.

This configuration allows to partly compensate for the voltage decrease in battery subpack string −1+1 due to the loss of the modules connected to in battery subpack string −2+2. As such the cascade connection offers an increased voltage to the load 48 (or its converter 50) compared to the situation where only battery subpack connection string −1+1 is connected to the load 48 (or its converter 44). The power and energy available to the load 48 also increase while respecting the limits of both battery pack strings as each battery string contributes to its own capabilities.

Eighth Embodiment

Figure 17:
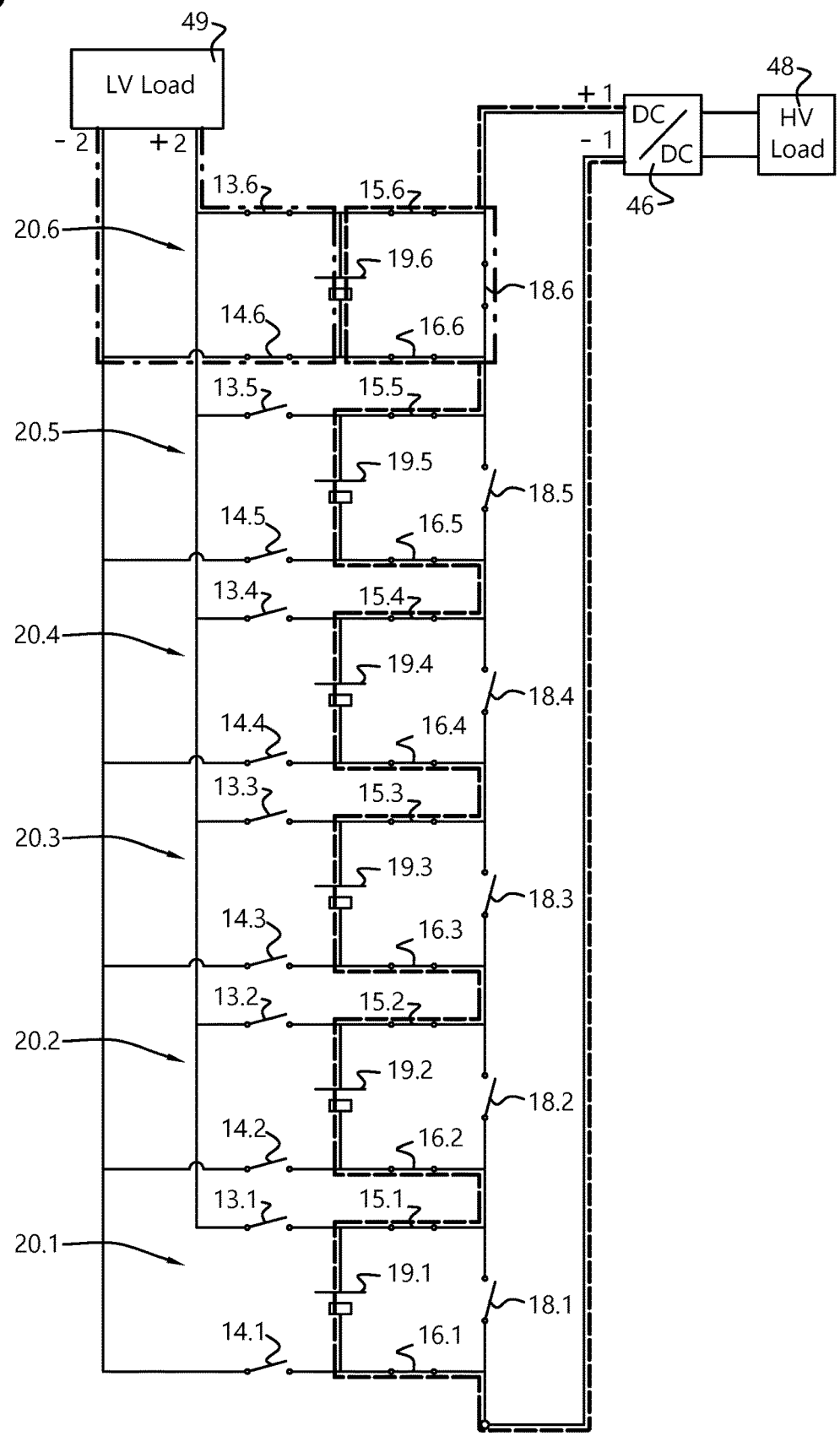
FIG. 17 shows a further embodiment of the present invention of a dynamic battery reconfiguration scheme where all modules are connected in series at first, while only some modules remain in series after module 20.6 is depleted.

The configuration of a battery according to this embodiment does not necessarily have to be static. In FIG. 17 some of the modules such as modules 20.1 to 20.5 retain a high capacity, while some of the modules such as module 20.6 have a reduced capacity. FIG. 17 illustrates the two ladder networks, modules 20.1-20.6, the switches 13-16, 18 and the energy storage cells 19.1-19.6 as previously described as well as one dc-dc converter 44 and two loads 48 and 49. In this embodiment, at the beginning modules 20 are put into the series connection string −1+1, until module 20.6, with its reduced capacity, has reached its minimum SoC. Once module 20.6 is depleted, the remaining modules 20.1-20.5 can remain connected to the available dc-dc converter 44 of string −1+1, while module 20.6 is put in the second battery subpack connection string −2+2 attached to load 49. This allows to deplete further the remaining battery modules 20.1-20.5 until all available energy is spent. In this way the usable energy of all modules can be used, without exceeding the voltage limits of any module.

This dynamic reconfiguration can also be used depending on the load profile of the load 48. E.g. when an EV drives in town, the battery subpack can first be used with only modules 20.1-20.5 as the speed is low and the required inverter voltage is also low. Afterwards the EV drives out of town onto the highway and both the required power and inverter dc-bus voltage increases. As a consequence module 20.6 is also placed in the series string to increase the voltage and provide power to the vehicle.

Further Embodiments

Figure 18:
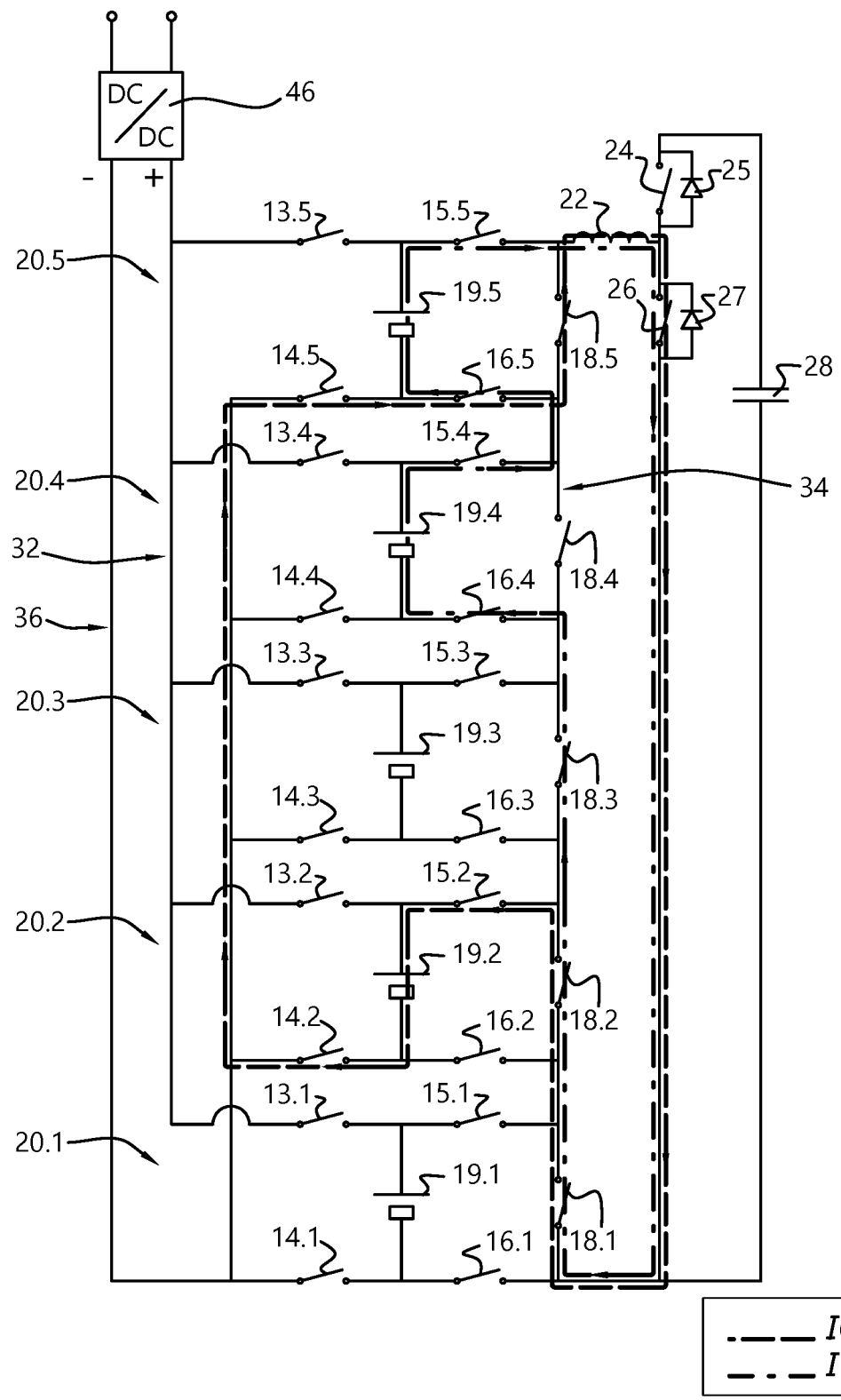
FIGS. 18 to 20 shows further embodiments of the present invention wherein energy is first stored in a storage element and then transferred between modules.

FIGS. 18 to 21 show further embodiments of the present invention for inter-module balancing. In FIG. 18, the rechargeable energy storage device includes modules, e.g. a battery pack includes battery modules 20.1 to 20.5. The battery modules 20 are arranged in a double ladder circuit with switches. The rungs of the ladder form "horizontal" connections in the ladders. Each rung of a first ladder circuit comprises wires linking two switches 13.1 to 13.5; 15.1 to 15.5 connected in series between two connection wires 32, 34. Each rung of a second ladder circuit comprises wires linking two switches 14.1 to 14.5, 16.1 to 16.4 connected in series between two connection wires 34, 36. Wire 34 can form a first battery subpack connection string −1+1. In a "vertical sense" at least some of the switches 15, 16 will act as connection switches in a series circuit −1, +1 whereas at least some of the switches 13, 14 will act as connection switches in a parallel circuit −2, +2. Bypass witches 18.1-18.5 can be used to bypass one or more cells in the series circuit −1, +1.

Between rungs of the first and second ladder circuits, one or more battery cells 19.1 to 19.5 are connected in each battery module 20. For each module 20, in battery subpack connection string −1+1, one bypass switch 18 is connected in parallel with the one or more battery cells 19 of that module 20. In each battery module 20, which can include one or more battery cells 19, there is arranged a network of banks of switches. A first bank of switches is arranged to connect a battery module 20 in a first battery subpack comprising series connection string −1+1 with other battery modules 20. A second bank of switches is arranged to connect a battery module 20 in a parallel connection with other battery modules 20 to form a second battery subpack connection string −2+2. A bypass switch 18 is arranged to exclude a battery module 20 from the first series connection string −1+1 when the first bypass switch 18 is activated.

As shown in FIG. 18 around each battery module 20 with one or more battery cells 19 a network of five switches is installed. These five switches are used as follows. A first set of switches 15, 16 is used to connect a or any module 20 to the "first/right" series connection string −1+1. If all modules 20 are within certain quality standards or specifications there is no need to reconnect certain modules 20 into a different battery pack. Then all modules 20 can be put in a single battery subpack series string −1+1 which can be connected to a load, optionally with a dc-dc converter between the load and battery subpack series string −1+1. Only the switches 15, 16 are closed in this case, while all other switches 13, 14 are open.

A second set of switches 13, 14 is used to connect a module 20 to a "second/left" parallel connection string −2+2. All modules 20 connected to this second battery subpack parallel string −2+2 are in parallel and at the same voltage. The bypass switch 18 is activated when the module 20 is excluded from the first battery subpack series string −1+1.

Wires 32 and 36 are connected to a DC-DC converter 46. In addition there is a load 22, shown here as an inductive load connected to one end of wire 34. The load 22 is preferably non-lossy or non-resistive. The inductor load 22 can be part of a DC-DC converter. The inductive load 22 is connected to a switch 26 with a bypass diode 27 and a switch 24 with a bypass diode 25. The other end of the switch 24 is connected to a capacitive load 28. The load 28 is connected to the first cell 20.1. Energy transfer is possible with this embodiment from several modules to a single module, in this embodiment energy is transferred from modules 20.4-20.5 to module 20.2. Initially modules 20.4 and 20.5 are discharged into the inductor 22. By closing switches 18.1, 18.2, 18.3, 16.4, 15.4; 16.5 and 15.5 the inductor 22 is charged (circuit IC). Then switches 18.3, 16.4, 15.4, 15.5 are opened and switches 15.2, 14.2, 14.5 and 18.5 are closed. The energy in the inductor 22 is now transferred to module 2 (circuit ID). The supervisory controller can control the opening and closing of the switches of the switching network.

Figure 19:
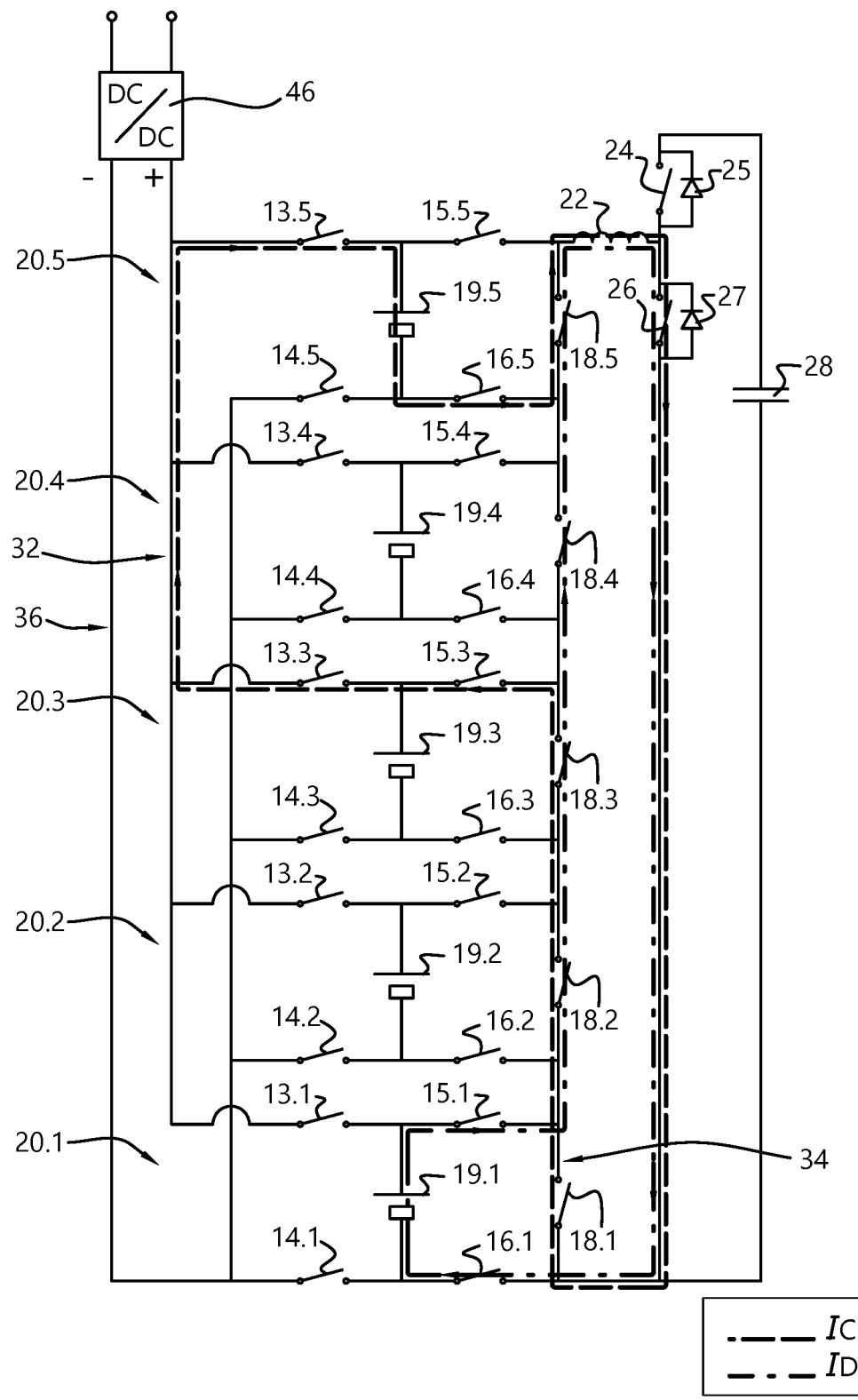

FIG. 19 shows a similar arrangement to that of FIG. 18. When switches 16.1, 15.1, 18.2, 18.3, 18.4, 18.5 are closed the load 22 such as an inductor load is charged (Circuit IC). The load 22 is preferably non-lossy or non-resistive. The inductor load 22 can be part of a DC-DC converter. Then switches 16.1, 15.1 and 18.4 are opened and 18.1, 15.3, 13.3, 13.5 and 16.5 are closed. The energy in the load such as inductor 22 now charges module 20.5 (ID). The supervisory controller controls the switches of the switching network.

Figure 20:
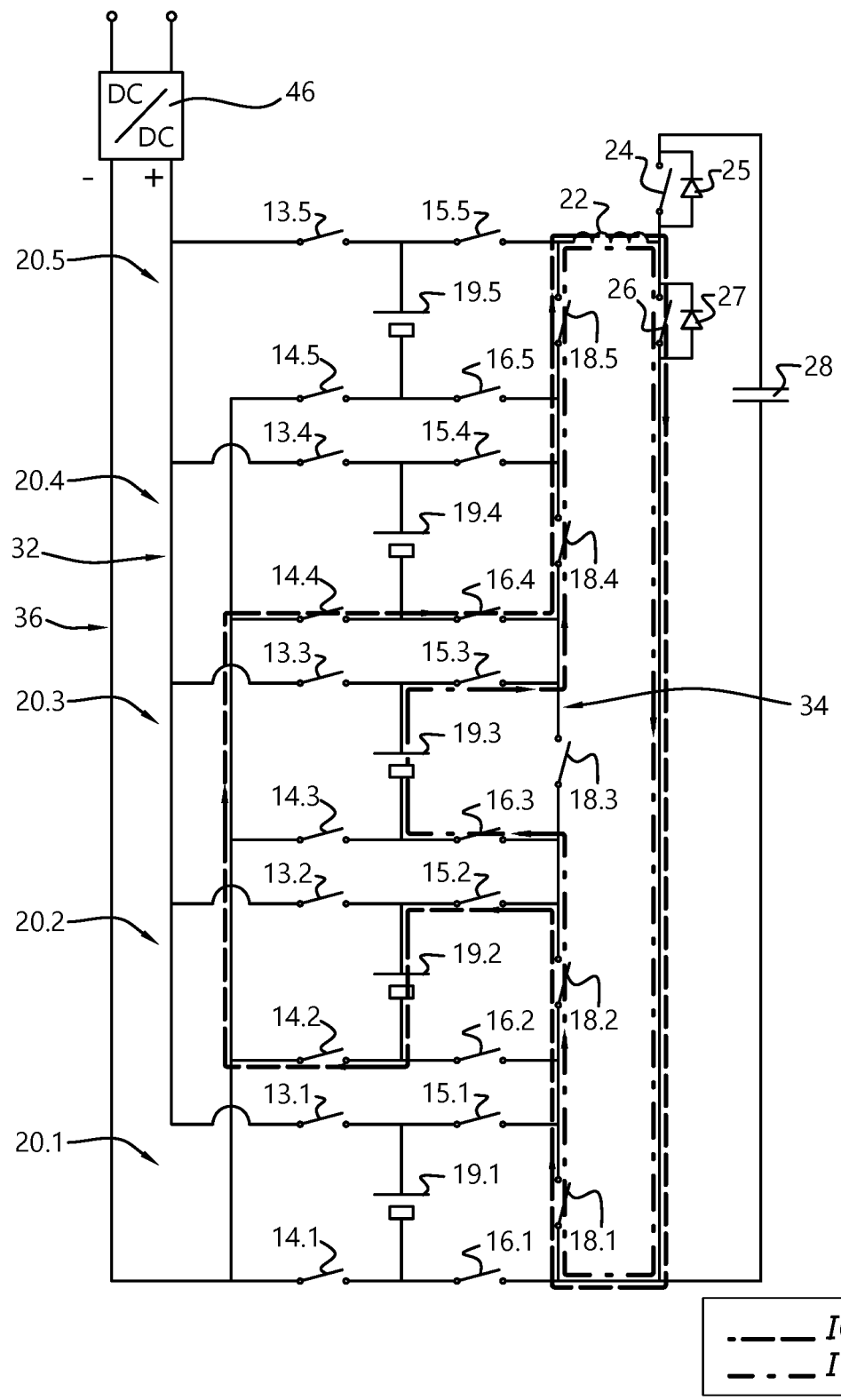

FIG. 20 shows a similar arrangement to that of FIG. 18. When switches 18.1, 18.2, 16.3, 15.3, 18.4, 18.5 are closed the load 22 such as an inductor load is charged (IC). The load is preferably non-lossy or non-resistive. The inductor load 22 can be part of a DC-DC converter. Switches 15.3, 18.4 are opened and 15.2, 14.2, 14.4, and 16.4 are closed. The energy in the load such as inductor 22 now charges module 20.2 (ID). The supervisory controller controls the switches of the switching network.

Figure 21:
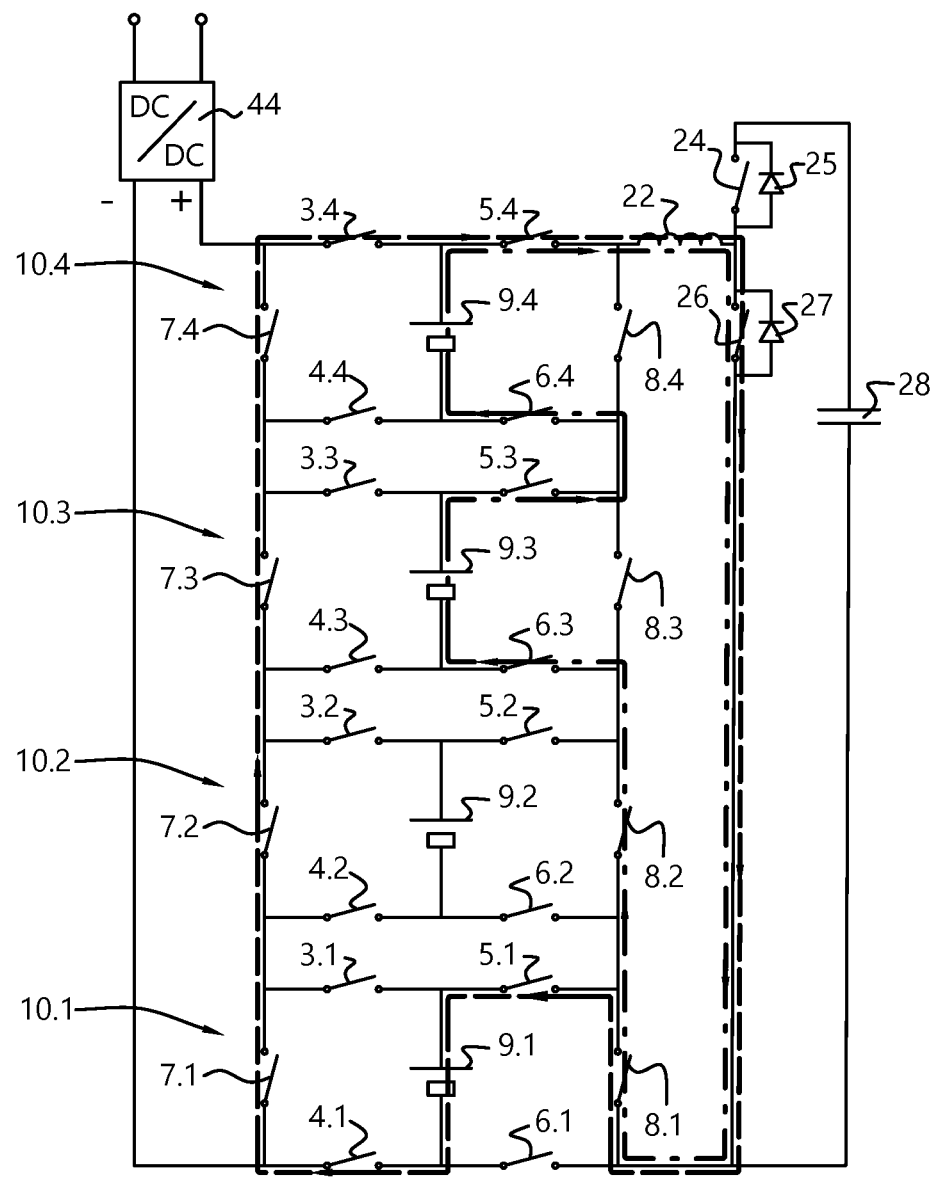
FIG. 21 shows a further embodiment of the present invention wherein energy is transferred between modules.

FIG. 21 illustrates the energy transfer in the case of a series-series configuration of both batteries (basic switching arrangement is as shown in FIGS. 1 to 10). When switches 8.1, 8.2, 6.3, 5.3, 6.4, 5.4 are closed the load 22 such as an inductor load is charged. The load 22 is preferably non-lossy or non-resistive. The inductor load 22 can be part of a DC-DC converter. Switches 8.2, 6.3, 5.3, 6.4 are opened and 5.1, 4.1, 7.1, 7.2, 7.3, 7.4, 3.4 and 5.4 are closed. The energy in the load such as inductor 22 now charges module 20.1. The supervisory controller controls the switches of the switching network.

As with all embodiments, the present invention relates to a method for the reconfiguration of a rechargeable energy storage such as batteries, hybrids such as LiCaps, ultracapacitors or supercapacitors, fuel cells or similar comprising modules with controllable switches which can be controlled by a controller. Such a controller can be provided with processing capability such as provided by one or more microprocessors, FPGA's, or a central processing unit (CPU) and/or a Graphics Processing Unit (GPU), and can be adapted to carry out their respective functions by being programmed with software, i.e. one or more computer programmes.

Such a controller may have memory (such as non-transitory computer readable medium, RAM and/or ROM), an operating system, optionally a display such as a fixed format display, data entry devices such as a keyboard, a pointer device such as a "mouse", serial or parallel ports to communicate other devices, network cards and connections to connect to any of the networks.

The software can be adapted to perform a method for the reconfiguration of a rechargeable energy storage such as batteries, hybrids such as LiCaps, ultracapacitors or supercapacitors, fuel cells or similar comprising modules with controllable switches. The software can be embodied in a computer program product adapted to carry out the following functions when the software is loaded onto the controller and executed on one or more processing engines such as microprocessors, ASIC's, FPGA's etc.:
connecting an energy storage module to a first series connection string in series with other energy storage modules, connecting an energy storage module in a second connection string with other energy storage modules, the second connection string being a second series connection string or a second parallel connection string.

The software can be embodied in a computer program product adapted to carry out the following functions when the software is loaded onto the controller and executed on one or more processing engines such as microprocessors, ASIC's, FPGA's etc.:
bypassing an energy storage device to exclude the energy storage module from the first series connection string, or the second connection string is a second series connection string, further comprising bypassing an energy storage module to exclude the energy storage module from the second series connection string.

The software can be embodied in a computer program product adapted to carry out the following functions when the software is loaded onto the controller and executed on one or more processing engines such as microprocessors, ASIC's, FPGA's etc.:
adjusting the output voltage of any or all of the first series connection string and the second connection string by controlling a dc-dc or dc-ac converter, or
adjusting the first output voltage of one of the first series connection string and the second connection string by controlling a first dc-dc or dc-ac converter and cascading the adjusted first output voltage with a second output of the other of the first series connection string and the second connection string and a second dc-dc or dc-ac converter.

The software can be embodied in a computer program product adapted to carry out the following functions when the software is loaded onto the controller and executed on one or more processing engines such as microprocessors, ASIC's, FPGA's etc.:
dynamically assigning one or more modules to the first or second connection string, or
isolating one or more modules from either the first or second connection strings.

The software can be embodied in a computer program product adapted to carry out the following functions when the software is loaded onto the controller and executed on one or more processing engines such as microprocessors, ASIC's, FPGA's etc.:
The software can be embodied in a computer program product adapted to carry out the functions of any of the inventions when the software is loaded onto the controller and executed on one or more processing engines such as microprocessors, ASIC's, FPGA's etc.:

Any of the above software may be implemented as a computer program product which has been compiled for a processing engine in any of the servers or nodes of the network. The computer program product may be stored on a non-transitory signal storage medium 30 such as an optical disk (CD-ROM or DVD-ROM), a digital magnetic tape, a magnetic disk, a solid state memory such as a USB flash memory, a ROM, etc.

The invention claimed is:

1. A system for reconfiguration of a rechargeable energy storage device into two or more connection strings,
    the rechargeable energy storage device comprising a plurality of energy storage modules, each of the plurality of energy storage modules having one or more energy storage cells and a network of banks of switches,
    a first bank of switches being adapted to connect one of the plurality of energy storage modules in a first series connection string with at least one other of the plurality of energy storage modules, a second bank of switches being adapted to connect one of the plurality of energy storage modules in a second connection string with at least one other of the plurality of energy storage modules, and a first bypass switch adapted to exclude one of the plurality of energy storage modules from the first series connection string,
    each of the one or more energy storage cells having a first terminal and a second terminal, the first terminal being connectable to the first connection string via a first switched connection and connectable to the second connection string via a second switched connection, the first switched connection comprising a first switch of the first bank of switches and the second switched connection comprising a second switch of the second bank of switches, the second terminal being connectable to the first connection string via a third switched connection and connectable to the second connection string via a fourth switched connection, the third switched connection comprising a third switch of the first bank of switches and the fourth switched connection comprising a fourth switch of the second bank of switches.

2. The system of claim 1, wherein the second connection string is selected from
    a second series connection string,
    a parallel connection string, and
    the second series connection string, further comprising a second bypass switch adapted to exclude one of the plurality of energy storage modules from the second series connection string.

3. The system of claim 1, wherein the first series connection string is connected to a first load and the second connection string being connected to a second load, a voltage rating of the first load being the same or different from the voltage rating of the second load, or
    the first series connection string and the second connection string being connected in parallel to a same load.

4. The system of claim 1, wherein any or both of the first series connection string and the second connection string is selected from:
    being connected to a dc-dc converter or a dc-ac converter,
    the first series connection string and the second connection string being each connected to a first dc-dc converter, a first dc-ac converter, a second dc-dc converter, and a second dc-ac converter, respectively and connected in parallel to a same load,
one of the first series connection string and the second connection string being connected to a first load and the dc-dc converter or the dc-ac converter is connected to the other of the first series connection string and the second connection string, said other of the first series connection string and the second connection string is connected to a second load, wherein a first voltage rating of the first load is the same or different from a second voltage rating of the second load, and
the first series connection string and the second connection string being connected to cascaded dc-dc converters or dc-ac converters.

5. The system of claim 1, further comprising a diagnostic test circuit for testing or for deriving for one or more of the plurality of energy storage modules any or all of SoC, SoH, current, voltage, impedance, and impedance spectrum.

6. The system of claim 1, wherein the plurality of energy storage modules are battery modules with battery cells, hybrid electrochemical energy storage devices, ultracapacitors, supercapacitors, or fuel cells.

7. The system of claim 1, further comprising a controller, the controller being selected from:
controlling at least one of the first bypass switch, the first bank of switches, or the second bank of switches comprise first controllable switches,
controlling a second bypass switch is adapted to exclude one of the plurality of energy storage modules from a second series connection string, or
controlling at least one of the first bypass switch, the first bank of switches, or the second bank of switches and controlling the second bypass switch.

8. The system of claim 7, wherein the first controllable switches, the second controllable switches, or both the first controllable switches and the second controllable switches are dynamically controllable to assign one or more of the plurality of energy storage modules to the first connection string or the second connection string.

9. A method for reconfiguring a rechargeable energy storage device into two or more connection strings, the rechargeable energy storage device comprising a plurality of energy storage modules, each of the plurality of energy storage modules having one or more energy storage cells and a bank of switches, the method comprising:
connecting one of the plurality of energy storage modules to a first series connection string in series with at least one other of the plurality energy storage modules,
connecting another one of the plurality of energy storage modules in a second connection string with at least one other of the plurality of energy storage modules, the second connection string being a second series connection string or a second parallel connection string, and all of the plurality of energy storage modules of the first connection string are isolated by the bank of switches from the second connection string,
each of the one or more energy storage cells having a first terminal and a second terminal, the first terminal being connectable to the first connection string via a first switched connection and connectable to the second connection string via a second switched connection, the first switched connection comprising a first switch of the first bank of switches and the second switched connection comprising a second switch of the second bank of switches, the second terminal being connectable to the first connection string via a third switched connection and connectable to the second connection string via a fourth switched connection, the third switched connection comprising a third switch of the first bank of switches and the fourth switched connection comprising a fourth switch of the second bank of switches.

10. The method of claim 9, wherein the second connection string is:
the second series connection string,
the second parallel connection string, or
the second series connection string, further comprising closing a second bypass switch to
exclude one of the plurality of energy storage modules from the second series connection string.

11. The method of claim 9, wherein connecting the first series connection string is selected from
connecting the first series connection string to a first load and the second connection string to a second load, a voltage rating of the first load being the same or different from a voltage rating of the second load, and
connecting the first series connection string and the second connection string in parallel to a same load.

12. The method of claim 9, comprising connecting any or both of the first series connection string and the second connection string to a dc-dc converter or a dc-ac converter, or
connecting each of the first series connection string and the second connection string to a first dc-dc converter, a first dc-ac converter, a second dc-dc converter, and a second dc-ac converter, respectively and in parallel to a same load.

13. The method of claim 9 comprising connecting one of the first series connection string and the second connection string to a first load,
connecting a dc-dc converter or a dc-ac converter to the other of the first series connection string and the second connection string, and
connecting the other of the first series connection string and the second connection string to a second load;
wherein a first voltage rating of the first load is the same or different from a second voltage rating of the second load.

14. The method of claim 9, comprising connecting the first series connection string and the second connection string to cascaded dc-dc converters or dc-ac converters.

15. The method of claim 9, further comprising performing a diagnostic test or deriving for one or more of the plurality of energy storage modules any or all of SoC, SoH, current, voltage, impedance, and impedance spectrum.

16. A non-transitory machine readable signal storage device comprising a computer program product comprising software code segments, which when implemented on a processing engine, executes the method of claim 9.

17. The method of claim 9, further comprising a controlling step selected from:
controlling at least one of the first bypass switch, the first bank of switches, or the second bank of switches as first controllable switches,
controlling a second bypass switch to exclude one of the plurality of energy storage modules from the second series connection string, wherein the second bypass switch is a second controllable switch, or
controlling at least one of the first bypass switch, the first bank of switches, or the second bank of switches and controlling the second bypass switch.

18. The method of claim 17, wherein the first controllable switches, the second controllable switches, or both the first controllable switches and the second controllable switches are dynamically controlled to assign one or more of the plurality of energy storage modules to the first connection string or the second connection string.

19. A controller configured to reconfigure a rechargeable energy storage device into two or more connection strings, the rechargeable energy storage device comprising a plurality of energy storage modules, each of the plurality of energy storage modules having one or more energy storage cells and a first bank of switches and a second bank of switches, the controller being adapted to control the first bank of switches and the second bank of switches so as to do at least one of the following:
   connect one of the plurality of energy storage modules in a first series connection string with at least one other of the plurality of energy storage modules,
   connect one of the plurality of energy storage modules in a second connection string with at least one other of the plurality of energy storage modules,
   connect one of the plurality of energy storage modules in the first series connection string with at least one other of the plurality of energy storage modules and connect one of the plurality of energy storage modules in the second connection string with at least one other of the plurality of energy storage modules, or
   exclude one of the plurality of energy storage modules from the first series connection string,
wherein the controller is configured to connect to the one or more energy storage cells, each of the one or more energy storage cells having a first terminal and a second terminal, the first terminal being connectable to the first connection string via a first switched connection and connectable to the second connection string via a second switched connection, the first switched connection comprising a first switch of the first bank of switches and the second switched connection comprising a second switch of the second bank of switches, the second terminal being connectable to the first connection string via a third switched connection and connectable to the second connection string via a fourth switched connection, the third switched connection comprising a third switch of the first bank of switches and the fourth switched connection comprising a fourth switch of the second bank of switches.

* * * * *